(12) United States Patent
Kellett et al.

(10) Patent No.: US 12,236,726 B2
(45) Date of Patent: Feb. 25, 2025

(54) SYSTEMS AND METHODS FOR AUTONOMOUS VEHICLE INCIDENT MANAGEMENT AND RECERTIFICATION

(71) Applicant: State Farm Mutual Automobile Insurance Company, Bloomington, IL (US)

(72) Inventors: Jennifer Criswell Kellett, Phoenix, AZ (US); An Ho, Tempe, AZ (US); Jerome Scott Trayer, Tempe, AZ (US); Jacob Thomas Simonson, Tempe, AZ (US); Jeremy Myers, Phoenix, AZ (US); Kip Wilson, Cave Creek, AZ (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 18/404,659

(22) Filed: Jan. 4, 2024

(65) Prior Publication Data

US 2024/0153321 A1    May 9, 2024

Related U.S. Application Data

(63) Continuation of application No. 16/850,700, filed on Apr. 16, 2020, now Pat. No. 11,922,734.
(Continued)

(51) Int. Cl.
*G07C 5/00* (2006.01)
*G05D 1/00* (2024.01)
*G07C 5/08* (2006.01)

(52) U.S. Cl.
CPC .......... *G07C 5/008* (2013.01); *G07C 5/0816* (2013.01); *G07C 5/085* (2013.01); *G05D 1/0088* (2013.01)

(58) Field of Classification Search
None
See application file for complete search history.

(56) References Cited

U.S. PATENT DOCUMENTS

| 6,028,537 A | 2/2000 | Suman |
| 7,953,615 B2 | 5/2011 | Aquila |

(Continued)

FOREIGN PATENT DOCUMENTS

| EP | 2273469 A1 | 1/2011 |
| EP | 3239686 A1 | 11/2017 |

(Continued)

OTHER PUBLICATIONS

"TENNA Delivers its Driver Vehicle Inspection Report (DVIR) System, That Keeps Fleets Safe, Operational and Compliant", Press Release, TENNA, Jul. 24, 2018, 2 pages, accessed online at URL: https://www.tenna.com/press_releases/tenna-delivers-driver-vehicle-inspection-report-dvir-system-keeps-fleets-safe-operational-compliant/.
(Continued)

*Primary Examiner* — Abdhesh K Jha
(74) *Attorney, Agent, or Firm* — Armstrong Teasdale LLP

(57) ABSTRACT

An incident management system for managing an incident response may be provided. The incident management system may include an incident management (IM) computing device and a vehicle. The IM computing device may include a processor and memory, the processor may be programmed to receive a notification that an incident has occurred, the notification including sensor data and sub-system data. The processor may analyze the data to determine an incident response, the determination including categorizing the incident based on damage determined from the data. The processor may also identify a responding party based on the incident response and the category of the incident. The processor may further parse the data to generate a set of critical data. The critical data may be based on the respond-
(Continued)

ing party. The processor may transmit a message to the responding party including the critical data and the location of the vehicle.

20 Claims, 11 Drawing Sheets

Related U.S. Application Data

(60) Provisional application No. 62/835,251, filed on Apr. 17, 2019, provisional application No. 62/965,326, filed on Jan. 24, 2020.

(56) References Cited

U.S. PATENT DOCUMENTS

| | | |
|---|---|---|
| 8,645,014 B1 | 2/2014 | Kozlowski |
| 9,311,271 B2 | 4/2016 | Wright |
| 9,342,967 B2 | 5/2016 | Recker |
| 9,342,976 B2 | 5/2016 | Pfeffer |
| 9,545,995 B1 | 1/2017 | Chau |
| 9,633,318 B2 | 4/2017 | Plante |
| 9,633,487 B2 | 4/2017 | Wright |
| 9,646,428 B1 * | 5/2017 | Konrardy ............ G06Q 10/0635 |
| 9,805,519 B2 | 10/2017 | Ramanujam |
| 9,830,748 B2 | 11/2017 | Rosenbaum |
| 9,964,948 B2 | 5/2018 | Ullrich |
| 9,990,782 B2 | 6/2018 | Rosenbaum |
| 10,027,711 B2 | 7/2018 | Gill |
| 10,043,323 B1 * | 8/2018 | Konrardy ......... G08G 1/096783 |
| 10,121,204 B1 | 11/2018 | Brandmaier |
| 10,192,369 B2 | 1/2019 | Wright |
| 10,198,879 B2 | 2/2019 | Wright |
| 10,269,190 B2 | 4/2019 | Rosenbaum |
| 10,467,824 B2 | 11/2019 | Rosenbaum |
| 10,553,119 B1 | 2/2020 | Shah |
| 11,227,452 B2 | 1/2022 | Rosenbaum |
| 11,407,410 B2 | 8/2022 | Rosenbaum |
| 11,524,707 B2 | 12/2022 | Rosenbaum |
| 11,594,083 B1 | 2/2023 | Rosenbaum |
| 11,614,735 B1 * | 3/2023 | Poeppel ................ G06V 20/58 701/2 |
| 2013/0197945 A1 | 8/2013 | Anderson |
| 2015/0100348 A1 | 4/2015 | Connery |
| 2015/0127570 A1 | 5/2015 | Doughty |
| 2016/0078695 A1 | 3/2016 | McClintic |
| 2016/0236638 A1 | 8/2016 | Lavie |
| 2018/0018723 A1 | 1/2018 | Nagla |
| 2019/0047493 A1 | 2/2019 | Chierichetti |
| 2019/0222994 A1 | 7/2019 | Florey |
| 2019/0244301 A1 | 8/2019 | Seth |
| 2019/0378352 A1 | 12/2019 | Dey |
| 2020/0027183 A1 | 1/2020 | Guttridge |
| 2020/0156652 A1 | 5/2020 | Abundis Vargas |
| 2022/0092893 A1 | 3/2022 | Rosenbaum |
| 2022/0340148 A1 | 10/2022 | Rosenbaum |
| 2023/0060300 A1 | 3/2023 | Rosenbaum |

FOREIGN PATENT DOCUMENTS

| | | |
|---|---|---|
| EP | 3578433 B1 | 8/2020 |
| EP | 3730375 B1 | 10/2021 |
| EP | 3960576 A1 | 3/2022 |
| EP | 4190659 A1 | 6/2023 |
| EP | 4190660 A1 | 6/2023 |
| WO | 2013124276 A1 | 8/2013 |
| WO | 2017018743 A1 | 2/2017 |
| WO | 2017089684 A1 | 6/2017 |
| WO | 2018187967 A1 | 10/2018 |

OTHER PUBLICATIONS

Martinez et al., "Emergency Services in Future Intelligent Transportation Systems Based on Vehicular Communications Networks" IEEE Intelligent Transportation Systems Magazine Summer 2010 (Year: 2010).

* cited by examiner

SYSTEMS AND METHODS FOR AUTONOMOUS VEHICLE INCIDENT MANAGEMENT AND RECERTIFICATION

CROSS-REFERENCE TO RELATED APPLICATIONS

This application is a continuation application of U.S. patent application Ser. No. 16/850,700 filed Apr. 16, 2020, entitled "SYSTEMS AND METHODS FOR AUTONOMOUS VEHICLE INCIDENT MANAGEMENT AND RECERTIFICATION," which claims the benefit of priority to U.S. Provisional Patent Application Ser. No. 62/835,251, filed Apr. 17, 2019, entitled "SYSTEMS AND METHODS FOR AUTONOMOUS VEHICLE INCIDENT MANAGEMENT AND RECERTIFICATION" and U.S. Provisional Patent Application Ser. No. 62/965,326, filed Jan. 24, 2020, entitled "SYSTEMS AND METHODS FOR AUTONOMOUS VEHICLE INCIDENT MANAGEMENT AND RECERTIFICATION," the entire contents and disclosures of which are hereby incorporated herein by reference in their entirety.

FIELD OF THE INVENTION

The present disclosure relates to managing autonomous vehicle incidents, and more particularly, to network-based systems and methods for assessing injury and damage associated with an incident involving an autonomous vehicle, and managing legal requirements and notifications, and initiating vehicle repair and recertification for the same autonomous vehicle.

BACKGROUND

Autonomous and semi-autonomous vehicles operating on public roadways and highways may encounter challenging situations that overwhelm vehicle navigation and control systems. For example, dynamic obstacles with unpredictable movement patterns may present path prediction problems and in some cases may exceed computational capabilities and/or operational control limitations of autonomous vehicles. In some cases, environmental hazards such as inclement weather or sudden disasters may cause breakdowns during vehicle operation. In other cases, unnavigable objects or barriers abruptly introduced into a vehicle path may require complex analysis be performed under extremely short time constraints. In addition, vehicle malfunction and/or maintenance failures may also contribute to operational failure and result in catastrophe.

In these and other scenarios, autonomous vehicle navigation and operation systems may fail to maintain safe vehicle operation. Damage to an autonomous vehicle caused by accident due to abnormal operating conditions may require initiating a variety of steps to restore a disabled vehicle to operation. For example, in the event of an automobile collision involving at least one autonomous vehicle, insurance information may need to be exchanged between parties after notifying authorities. In some cases, in the event of injury, emergency rescue services may still need to be requested. Notification of vehicle owners may also be necessary. In some cases, including accidents involving autonomous, other third parties such as manufacturers may need to be notified. In vehicle-to-vehicle or multi-vehicle collisions, multiple owners may need to be contacted. In incidents involving land or structures, property owners may also need to be contacted.

Incidents that disable vehicles including autonomous vehicles or otherwise prevent normal operation may require initiating vehicle recovery and repair. In such cases, available tow and/or other rescue vehicles may need to be located. Repair facilities may also need to be reserved. Upon restoration, autonomous vehicles may require recertification before returning to operation of an autonomous vehicle before said vehicle can be returned to service. For example, government regulations may require specific evaluation and testing procedures be performed to confirm safe operation. Executing the multitude of steps needed to restore operational capability and verifying that repairs have been adequately performed to regulatory standards may require coordinating between numerous entities. Management of incidents and restoring autonomous vehicles to safe operation may therefore require significant time and resources. Accordingly, there exists a need to manage incident response procedures and to efficiently verify recovery and restoration of autonomous vehicles to regulatory standards and operational capabilities.

BRIEF SUMMARY

The present embodiments may relate to systems and methods for autonomous vehicle incident management and recertification, and more particularly, an incident management system for managing an incident response. The incident management system may include at least one incident management (IM) computing device, the IM computing device in communication with at least one vehicle. The IM computing device may include at least one processor and at least one memory device, the at least one processor programmed to: (i) receive, from the vehicle, a notification that an incident has occurred, the notification including sensor data and sub-system data; (ii) analyze the sensor data and sub-systems data to determine an incident response, the determination of the incident response including categorizing the incident based at least on a type of damage determined from the sensor data and sub-systems data; (iii) identify at least one responding party based on the determined incident response, wherein the identifying of the at least one responding party is based on at least the category of the incident; (iv) parse the sensor data and sub-systems data to generate a set of critical data to transmit to the at least one responding party, the set of critical data based on the at least one responding party; and/or (v) transmit a message to the at least one responding party including at least the determined set of critical data and a location of the vehicle. The system may include additional, less, or alternate functionality, including those discussed elsewhere herein.

In another aspect, a computer-implemented method for incident management may be provided. The method may be implemented using an incident management (IM) computing device. The IM computing device may include at least one process in communication with at least one memory device. The method comprising (i) receiving, from the vehicle, a notification that an incident has occurred, the notification including sensor data and sub-system data; (ii) analyzing the sensor data and sub-systems data to determine an incident response, the determination of the incident response including categorizing the incident based at least on a type of damage determined from the sensor data and sub-systems data; (iii) identifying at least one responding party based on the determined incident response, wherein the identifying of the at least one responding party is based on at least the category of the incident; (iv) parsing the sensor data and sub-systems data to generate a set of critical data to transmit to the at least one responding party, the set of critical data based on the at least one responding party; and/or (v) transmitting a message to the at least one responding party including at least the determined set of critical data and a location of the vehicle. The method may include additional, less, or alternate functionality, including those discussed elsewhere herein.

In a further aspect, at least one non-transitory computer-readable storage media having computer-executable instructions embodied thereon may be provided. When executed by a comprising at least one processor, the computer-executable instructions may cause the at least one processor to: (i) receive, from the vehicle, a notification that an incident has occurred, the notification including sensor data and sub-system data; (ii) analyze the sensor data and sub-systems data to determine an incident response, the determination of the incident response including categorizing the incident based at least on a type of damage determined from the sensor data and sub-systems data; (iii) identify at least one responding party based on the determined incident response, wherein the identifying of the at least one responding party is based on at least the category of the incident; (iv) parse the sensor data and sub-systems data to generate a set of critical data to transmit to the at least one responding party, the set of critical data based on the at least one responding party; and/or (v) transmit a message to the at least one responding party including at least the determined set of critical data and a location of the vehicle. The storage media may include additional, less, or alternate actions, including those discussed elsewhere herein.

In yet another aspect, an incident management system for managing an incident response may be provided. The incident management system may include at least one incident management (IM) computing device, the IM computing device in communication with at least one vehicle. The IM computing device may include at least one processor and at least one memory device, the at least one processor programmed to: (i) determine that an incident associated with the vehicle has occurred; (ii) analyze incident data received from the vehicle including at least sensor data and sub-system data to perform a damage assessment to determine an incident response; (iii) generate a block on a blockchain including the incident data and the damage assessment; (iv) identify at least one recertifying party based on the determined incident response and transmit the block on the blockchain and a request for services to the at least one recertifying party; (v) receive from the at least one recertifying party an updated block on the blockchain including at least recertification event data, the recertification event data including procedures performed on the vehicle; and/or (vi) store the updated block on the blockchain associated with the vehicle in a recertification events database. The system may include additional, less, or alternate functionality, including those discussed elsewhere herein.

In another aspect, a computer-implemented method for incident management may be provided. The method may be implemented using an incident management computing device including at least one processor in communication with at least one memory device, the method comprising: (i) determining that an incident associated with the vehicle has occurred; (ii) analyzing incident data received from the vehicle including at least sensor data and sub-system data to perform a damage assessment to determine an incident response; (iii) generating a block on a blockchain including the incident data and the damage assessment; (iv) identifying at least one recertifying party based on the determined incident response and transmit the block on the blockchain and a request for services to the at least one recertifying party; (v) receiving from the at least one recertifying party an updated block on the blockchain including at least recertification event data, the recertification event data including procedures performed on the vehicle; and/or (vi) storing the updated block on the blockchain associated with the vehicle in a recertification events database. The method may include additional, less, or alternate functionality, including those discussed elsewhere herein.

In further aspect, at least one non-transitory computer-readable storage media having computer-executable instructions embodied thereon may be provided. When executed by a comprising at least one processor, the computer-executable instructions may cause the at least one processor to: (i) determine that an incident associated with the vehicle has occurred; (ii) analyze incident data received from the vehicle including at least sensor data and sub-system data to perform a damage assessment to determine an incident response; (iii) generate a block on a blockchain including the incident data and the damage assessment; (iv) identify at least one recertifying party based on the determined incident response and transmit the block on the blockchain and a request for services to the at least one recertifying party; (v) receive from the at least one recertifying party an updated block on the blockchain including at least recertification event data, the recertification event data including procedures performed on the vehicle; and/or (vi) store the updated block on the blockchain associated with the vehicle in a recertification events database. The storage media may include additional, less, or alternate actions, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
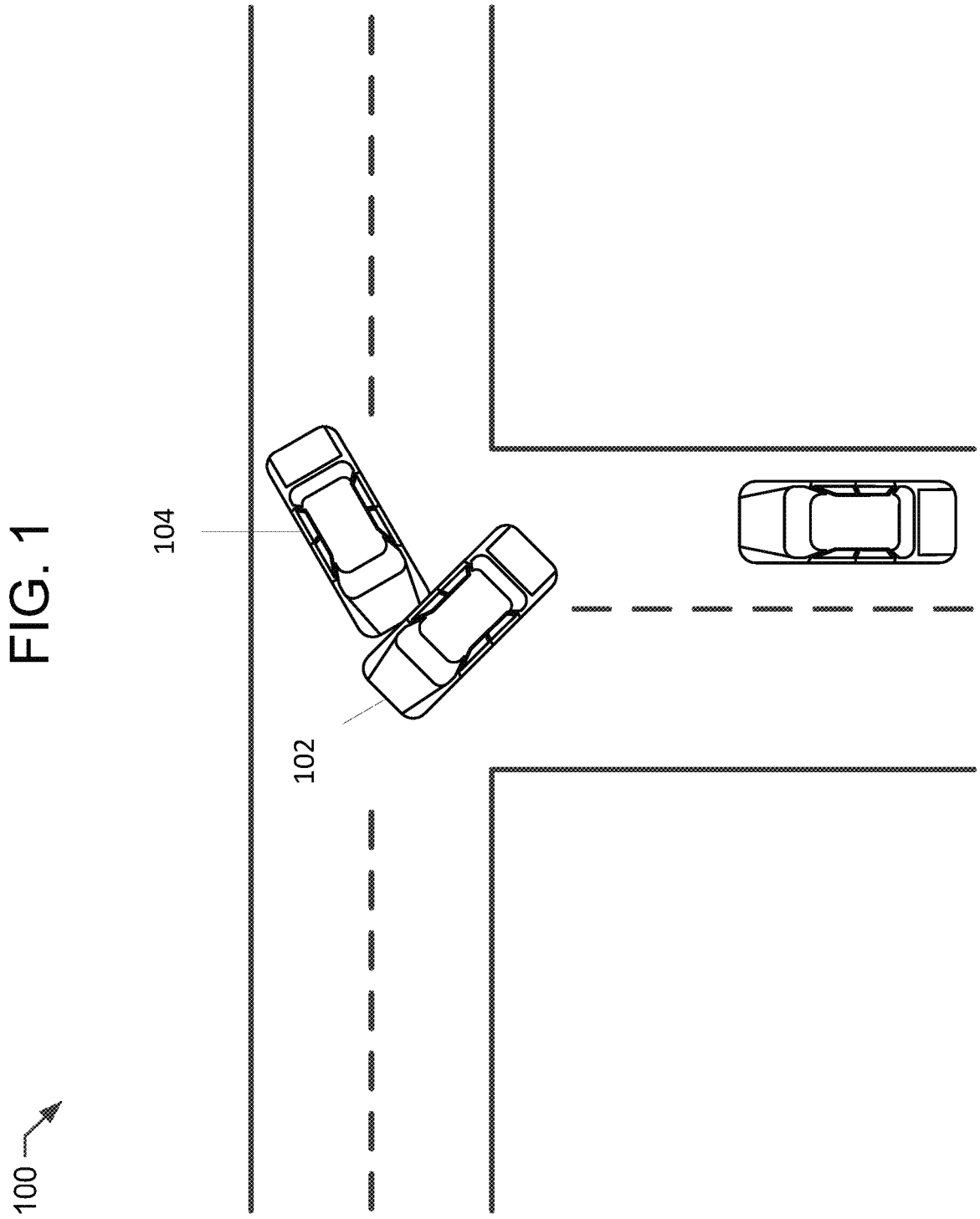
FIG. 1 illustrates an exemplary multi-vehicle incident.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for autonomous vehicle incident management and recertification. Autonomous vehicles engaged in transporting passengers along busy thoroughfares may become involved in incidents such as collisions with other autonomous, semi-autonomous, or manually operated vehicles and/or other obstacles, barriers, or hazards. Vehicles disabled in incidents may need to be recovered and repaired. Restored vehicles may require recertification to verify that the vehicle may safely operate on public thoroughfares and roadways. In one exemplary embodiment, the systems and methods described herein may be performed by an incident management system ("IMS"). As used herein, incident is defined to mean a single vehicle accident, a multi-vehicle accident, a mechanical or software failure involving a vehicle that renders the vehicle non-operational or at least partially non-operational, or any other failure involving a vehicle that may impact the operation of that vehicle.

In the exemplary embodiment, a user (e.g., an owner of an autonomous, semi-autonomous, or manually operated vehicle) enrolls in the IMS to receive incident management services. The IMS may provide a user interface for collecting information from the user. For example, IMS may include a web server configured to generate a user interface (e.g., web interface) in the form of a web page. The user may use a user computing device (e.g., a mobile device, desktop computer, etc.) to communicate with the IMS. In some embodiments, the user may download an app onto the user computing device to interface with the IMS. Additionally or alternatively, a user interface may be provided by the vehicle.

In the exemplary embodiment, the user inputs information via the user interface including at least information associated with at least one autonomous, semi-autonomous, or manually operated vehicle, hereinafter simply referred to as "the vehicle." Data input by the user may include the type of vehicle, age of the vehicle, maintenance history, performance capabilities, type of tires and pressure, fuel level and type (e.g., octane rating), etc. The user may also input information such as the likely geographical location of operation. In some embodiments, the web interface may be configured to allow the user to periodically update previously entered information and/or enter in temporary information (e.g., if a user is planning to travel to a remote location only once). In some embodiments, relevant information pertaining to the vehicle may be automatically transmitted by the vehicle to the IMS. Information such as geographical location and travel data stored by the IMS may enable faster response time in the event of an incident. In some embodiments, the user may own multiple vehicles (e.g., a fleet of vehicles for providing passenger services) and wish to retain incident management services for the fleet.

In the exemplary embodiment, the IM computing device may receive a notification from the vehicle that the vehicle has been engaged in an incident. For example, the vehicle may be involved in a collision due to inclement weather. The vehicle may be damaged and may automatically initiate a self-diagnosis to assess the damage and determine whether sufficient mobile capabilities remain to redirect travel to a repair facility and/or a safe location the does not impede other traffic to await rescue and recovery. In some cases, the vehicle may be disabled and unable to engage self-drive capabilities. Notification of the current state of the vehicle may be transmitted to the IMS. The IMS may analyze the data received from the vehicle and determine a course of action. In some embodiments, the IMS may notify the owner and/or the passenger(s) of the vehicle and offer via a user computing device a variety of different options for selection to identify a course of action.

In the exemplary embodiment, if the vehicle is disabled, it may be transported to a repair facility for repair. The repair facility may provide a method of verification of services rendered such as a certificate and/or records of repair. For example, for a wheel replacement, a record may be generated indicating the replacement, the type of replacement wheel, the cost of the replacement wheel, the time of the repair, the labor costs, the location of the repair facility, and the method of replacement. The record may be stored digitally and/or transmitted to a remote server, such as the IMS. In the exemplary embodiment, the repair facility may modify a block of a blockchain associated with the vehicle to record repairs performed on the vehicle.

A blockchain is a distributed database that maintains a continuously-growing list of ordered records, known as blocks. Each block may contain at least a timestamp and a link to the previous block in the chain. The link to the previous block may be a hash of the previous block. In the exemplary embodiment, the repair facility conducts repairs on the vehicle and generates additional blocks on the blockchain, each block representing a repair performed and including repair data associated with the repair conducted. For storing vehicle operability information, the first block may store vehicle information and initial vehicle state data. The second block may contain maintenance data. The second block may contain a hashed copy of the first block as well. The third block may contain incident and repair data. This continues on with each block adding on to the next while containing a hash of the previous blocks in the blockchain. In the exemplary embodiment, the blockchain may include vehicle data, ownership data, repair data, maintenance data, travel data, testing data, auditing data, and vehicle self-diagnostic data.

To ensure the security of the information contained in the blockchain, copies of the blockchain may be distributed across multiple computer devices, known as nodes. These nodes maintain the blockchain, update the blockchain when changes occur, and ensure the stability of the blockchain itself. In some embodiments, nodes may be also used to calculate the hash of the previous blocks. As the blockchain grows, the processing power needed to calculate the hash of the previous blocks grows as well. In these embodiments, the processing of the hash may be distributed over multiple computer devices to improve the speed of processing and/or to not overburden the hashing processor. When a node processes (hashes) a block, that node is known as a miner, where the action of validating and hashing the block is also known as mining.

Data from multiple sources may be used to add blocks to the blockchain. In the exemplary embodiment, as part of the repair and restoration process, the vehicle may be transported to a testing facility to perform testing on the vehicle. For example, the vehicle may undergo emissions testing. In some embodiments, the testing facility may perform a general performance test followed by specific tests directed towards aspects of the vehicle affected by the incident and/or previous incidents. Other facilities may also separately record repair, maintenance, and/or travel data in the blockchain. For example, a facility specializing in exterior bodywork may conduct repairs and/or maintenance while separately an electronics repair facility may also conduct repairs and/or maintenance, each respectively recording data to the blockchain associated with the vehicle. Separate testing facilities may also independently perform evaluations of the vehicle. For example, a first testing facility may perform evaluation of the electronics while another may evaluate motor function and a third may evaluate frame and suspension systems, each respectively recording data to the blockchain.

In some embodiments, the blockchain includes stored procedures (e.g., smart contracts, chaincode) that are configured to automatically perform certain functionality within the blockchain. For example, the blockchain may include stored procedures for matching, updating, and outputting a title statement of record (SOR) with an insurance SOR, validating, updating, and outputting insurance dates and state minimum coverages, pend matches into queue to wait for trigger (e.g., brand new vehicles in queue pended to wait for DMV title), manage error queue to send, resend, and resolve mismatches through intelligent processing, send notifications (e.g., when insurance status changes), or provide historical data stream to troubleshoot and predict deviation and potential fraud. In some embodiments, the smart contracts are included in the blocks of the blockchain. For example, a smart contract may be created on the blockchain after each incident involving the vehicle.

In the exemplary embodiment, the IMS may initiate an audit of the vehicle for road-worthiness by initially performing an examination of the blockchain, analyzing the stored data, and cross-referencing the data with third-party data such as government records indicating, for example, that repair facilities are accredited and/or if licensures are current. Upon confirmation that repairs have been properly performed by accredited repair facilities and that licensed testing facilities have determined that the vehicle has met the regulatory standard for operation on roadways, the vehicle may be determined to be recertified for operation on public thoroughfares and may return to transportation activities. The IMS may notify parties that recertification is complete. For example, owners waiting for restoration may be notified, government entities responsible for transportation and safety may be notified, and/or insurance providers for the vehicle may be notified.

Repairs and testing performed at specific, predetermined facilities may provide certain benefits. For example, in some embodiments, repairs performed at select facilities identified by insurance providers may allow for reduced insurance expenses and/or discounts. In another example, repairs performed at accredited and/or licensed facilities may enable ratings agencies to rate vehicles repaired at the facility for higher safety and/or performance. In some cases, owners and/or passengers may prefer higher rated vehicles incentivizing repair and maintenance at specific providers. In the exemplary embodiment, the IMS may provide options for selecting individual providers or groups of providers for repair and/or maintenance services.

In some embodiments, individual users (e.g., owners of autonomous or semi-autonomous vehicles) may enroll in services provided by the IMS. Registration for incident response services with the IMS may include an opt-in procedure where users "opt in" (e.g., provide informed consent) to receiving messages from the IM computing device. This allows the IMS to be in compliance with consumer protection laws and privacy regulations. Thus, a user opts in to the IMS and consents to receive communication messages when they enroll in incident management services. In other embodiments, the user may opt in and provide consent by transmitting an affirmative consent message to the IM computing device. The consent message may indicate user consent from the user in transmitting and receiving messages at the user's user computing device.

In some embodiments, the enrollment data and/or other collected data may be anonymized and/or aggregated prior to receipt such that no personally identifiable information (PII) is received. In other embodiments, the system may be configured to receive application data and/or other collected data that is not yet anonymized and/or aggregated, and thus may be configured to anonymize and aggregate the data. In such embodiments, any PII received by the system is received and processed in an encrypted format or is received with the consent of the individual with which the PII is associated.

In situations in which the systems discussed herein collect personal information about individuals, or makes use of such personal information, the individuals may be provided with an opportunity to control whether such information is collected and/or control how such information is used. For example, the IM computing device may generate a settings user interface to enable a user to configure settings options including disabling certain functionality of the IM computing device. In addition, certain data may be processed in one or more ways before it is stored or used, so that PII is removed. Alternatively or additionally, a user may affirmatively opt-out of the IMS via a user interface provided by the IM computing device and/or a remote server or by deleting or otherwise removing any software or app installed on the user computing device performing incident management functions.

The IMS may also be configured to prevent access to certain PII by securely encrypting the information in a local or remote database with restricted access rights. Decryption of secured data may thus be limited to authorized computing devices and/or personnel authenticated within a safe zone (e.g., physically present at a specified location). Further, PII may be in a hashed format (e.g., SHA-1, SHA-2, MD5) and unreadable by a human user.

Accordingly, the systems and methods described herein address at least these problems. Specifically, the systems and methods described herein may be implemented using computer programming or engineering techniques including computer software, firmware, hardware, or any combination or subset thereof, wherein the technical effects may be achieved by performing at least one of the following steps: (i) receiving, from a vehicle, a notification that an incident has occurred; (ii) receiving, from the vehicle, sensor data and sub-systems data; (iii) analyzing the sensor data and sub-systems data; (iv) determining an incident response based on the analyzing; (v) determining at least one relevant party; (vi) determining critical data to transmit to the at least one relevant party; (vii) generating a notification including at least the determined critical data; and (viii) transmitting the notification to the at least one relevant party.

Exemplary technical effects of the systems, methods, and computer-readable media described herein may include, for example: (i) initiating contact with emergency services in the event of an incident with a vehicle; (ii) automatically satisfying legal requirements associated with an incident such as exchanging insurance information and reporting incidents to local authorities; (iii) performing self-diagnostics of vehicle systems to determine if a vehicle is disabled and requires rescue and recovery (e.g., tow service); (iv) analyzing sensor data to determine injuries and transmitting injury data to emergency responders; (v) assessing vehicle damage, determining the repairs required, and identifying nearby repair facilities, and requesting transportation to the repair facilities; (vi) automatic notifications of incidents to owners and manufacturers; (vii) generating accessible transparent ledgers (e.g., in a blockchain) to record repairs, vehicle testing, and audits; (viii) automatically transmitting blocks and/or smart contracts over a blockchain to repair facilities, auditors, and testing facilities to record repair, testing, and auditing procedures; and/or (ix) enabling third parties to examine records of repairs, tests, and audits to verify and recertify vehicles back into operation.

Exemplary Vehicle Incident

FIG. 1 illustrates an exemplary multi-vehicle incident 100. Incident 100 may include, for example, an exemplary vehicle 102 engaged in a collision with a second vehicle 104. Incident 100 may be any type of event causing damage to autonomous vehicle 102 and/or harm to passengers of exemplary vehicle 102 or otherwise causes disruption to normal vehicle operation. Exemplary incident 100 is merely an example of an event causing damage to exemplary vehicle 102 and is not meant to limit the type of incidents that may benefit from responsive incident management of exemplary vehicle 102. For example, incident 100 may include weather related events such as hurricanes, tornados, earthquakes and the like. In other examples, exemplary vehicle 102 may simply be out of fuel. In the exemplary embodiment, exemplary vehicle 102 may have been previously certified to operate on public thoroughfares. After incident 100, exemplary vehicle 102 may require recertification before returning to operation on public thoroughfares.

In the exemplary embodiment, incident 100 occurs during operation of vehicles 102 and 104. In some embodiments, incident 100 may occur when autonomous vehicle 102 is not in operation. In some embodiments, incident 100 may occur in locations other than roadways (e.g., dirt paths, trails, off road operation, etc.). In other embodiments, incident 100 may include fewer or additional vehicles and/or other objects capable of causing damage to and/or disabling exemplary vehicle 102.

Exemplary Vehicle and Incident Management System

Figure 2:
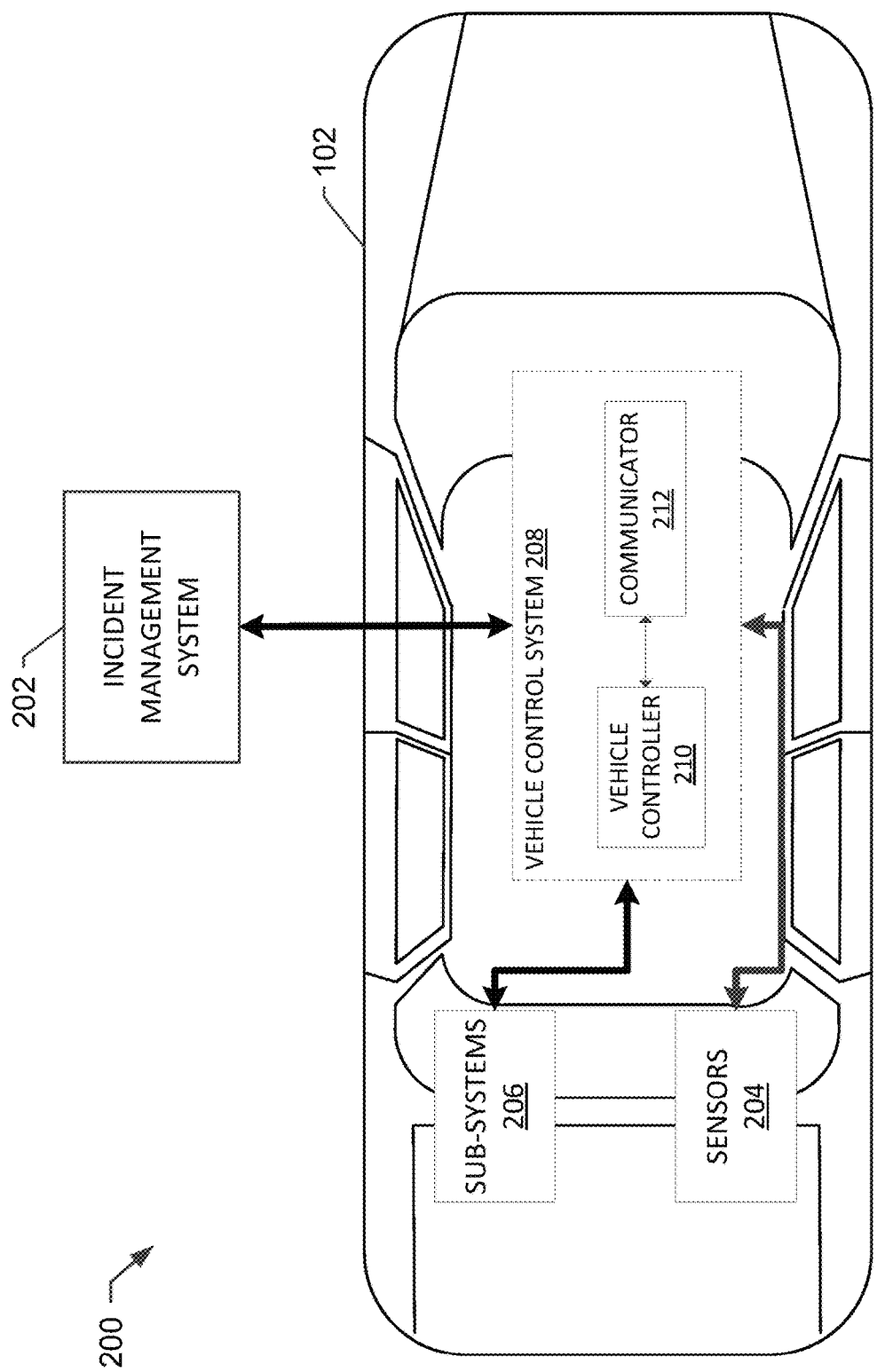
FIG. 2 illustrates a view of an exemplary vehicle shown in FIG. 1 in communication with an incident management system (IMS)

FIG. 2 illustrates a view of exemplary vehicle 102 shown in FIG. 1 in communication with an incident management system (IMS) 202. As shown in FIG. 2, exemplary vehicle 102 is an autonomous or semi-autonomous vehicle capable of fulfilling the transportation capabilities of a traditional automobile or other vehicle (e.g., aircraft, watercraft, submersible, or spacecraft). In these embodiments, exemplary vehicle 102 is capable of sensing its environment and navigating without human input. In some embodiments, exemplary vehicle 102 may include manual capabilities that enable a human driver to operate and control vehicle 102, essentially taking manual control of said autonomous or semi-autonomous vehicle 102. Exemplary vehicle 102 may include a plurality of sensors 204, sub-systems 206, and a vehicle control system 208. Vehicle control system 208 may include a vehicle controller 210, and a communicator (e.g., a transmitter and receiver assembly) 212. In the exemplary embodiment, vehicle control system 208 is in communication with an incident management system 202.

Sensors 204 may include, but are not limited to, radar, LIDAR, Global Positioning System (GPS), video devices, imaging devices (e.g., photographic, infrared, thermal, etc.), cameras (e.g., 2D and 3D cameras), and audio recorders. The plurality of sensors 204 may detect the current surroundings and location of exemplary vehicle 102. Specifically, sensors 204 may be configured to detect nearby/surrounding vehicles, barriers, or other objects that may hinder the safe operation of the vehicle or at least require additional navigation to navigate around such vehicles, barriers, and/or other objects.

In the exemplary embodiment, sensors 204 are used for navigation, vehicle operation, and incident analysis. Conditions of vehicle 102 detected by the plurality of sensors 204 may include speed, acceleration, gear, braking, cornering, vehicle operation, and other conditions related to the operation of vehicle 102, for example: at least one of a measurement of at least one of speed, direction rate of acceleration, rate of deceleration, location, position, orientation, and rotation of the vehicle, and a measurement of one or more changes to at least one of speed, direction, rate of acceleration, rate of deceleration, location, position, orientation, and rotation of the vehicle (collectively referred to as "telematics data"). The telematics data may also include a tread depth of one or more vehicle tires, an environmental sensor reading (e.g., temperature, humidity, acceleration, etc.), vehicle mileage, vehicle oil and fluid levels, tire pressure, tire temperature, vehicle brake pad thicknesses, gyroscope and accelerometer sensor information, GPS information, and the like.

Exemplary vehicle 102 includes sub-systems 206 that are in communication with sensors 204 and vehicle control system 208. Sub-systems 206 may include a number of independent systems controlled by vehicle control system 208. Each sub-system of sub-systems 206 may be in communication with at least one other sub-system of sub-systems 206. Sub-systems 206 may include systems directed to steering/suspension, cooling, braking, axle/differential, engine performance, automatic transmission, drivetrain and axles, electrical/electronic systems, and climate control (e.g., heating and air conditioning). Sub-systems 206 may have corresponding independent, networked, and/or combined electronic control units that react, based on signals received from vehicle control system 28, in a timely manner to operate vehicle 102. Sub-systems 206 may generate and/or store, in a memory area, data related to operation of the vehicle. For example, steering commands, degree and/or angle of steer, speed of change in direction, direction of a steer command, etc., may be recorded in a memory area. Other data related to any of the sub-systems of vehicle 102 may also be recorded in a similar manner but with respect to the operation of the respective sub-system. Sub-systems 206 may also independently store malfunctions and/or failures of the systems of vehicle 102.

As described above, vehicle control system 208 may include vehicle controller 210 and communicator 212. Communicator 212 is configured to transmit and receive data to and from IMS 202. In the exemplary embodiment, vehicle controller 210 may be configured to process instructions received from IMS 202.

In some embodiments, vehicle controller 210 may include a display screen or touchscreen (not shown) that is capable of receiving user input, such as, for example, trip data (e.g., trip destination), from a driver of vehicle 102. In other embodiments, vehicle controller 210 may be capable of wirelessly communicating with a user computer device (not shown) such as a mobile device (not shown) in vehicle 102. In these embodiments, vehicle controller 210 may be capable of communicating with the user of the mobile device, such as the driver, through an application of the mobile device.

In some embodiments, vehicle 102 may include autonomous or semi-autonomous vehicle-related functionality or technology that may be used with the present embodiments to replace human driver actions and may include and/or be related to the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; and/or (s) automatic or semi-automatic driving without occupants; and/or other functionality. In these embodiments, the autonomous or semi-autonomous vehicle-related functionality or technology may be controlled, operated, and/or in communication with host vehicle controller 210.

The wireless communication-based autonomous or semi-autonomous vehicle technology or functionality may include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally or alternatively, the autonomous or semi-autonomous technology or functionality may include and/or be related to: driver alertness or responsive monitoring; pedestrian detection; artificial intelligence and/or back-up systems; navigation or GPS-related systems; security and/or anti-hacking measures; and/or theft prevention systems.

While vehicle 102 may be an automobile in the exemplary embodiment, in other embodiments, vehicle 102 may be, but is not limited to, other types of ground craft, aircraft, and watercraft vehicles.

Exemplary Flow Diagram of Incident Management

Figure 3:
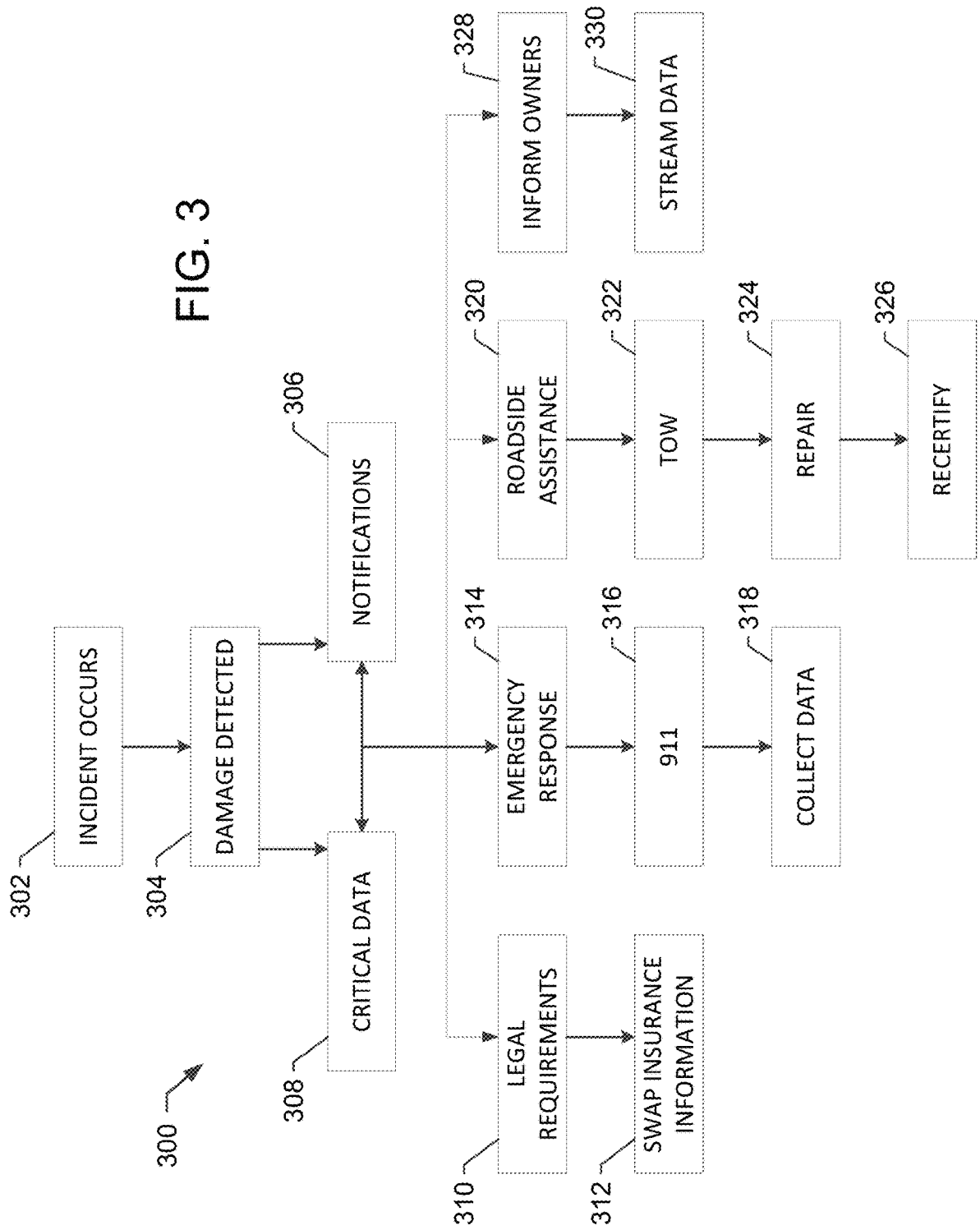
FIG. 3 illustrates a flow diagram of the IMS shown in FIG. 2.

FIG. 3 illustrates a flow diagram 300 of steps that may be performed by IMS 202 shown in FIG. 2. Flow diagram 300 illustrates one exemplary embodiment for managing a response to exemplary incident 100 shown in FIG. 1. In the exemplary embodiment, an incident occurs 302. The occurrence 302 of an incident may be determined by vehicle 102 shown in FIG. 1. In some embodiments, if no damage is detected to vehicle 102, harm to passengers, and/or damage and/or harm to people or property outside vehicle 102, vehicle 102 may resume normal operation. In the exemplary embodiment, damage is detected 304. Detected damage 304 may include harm to passengers, damage to property outside vehicle 102, damage to the vehicle, and/or harm to others. Detected damage 304 may include other events requiring intervention such as disabled vehicles and/or other barriers interfering with the flow of traffic.

In the exemplary embodiment, damage is detected and notifications 306 are transmitted. Notifications 306 may include information such as location data, the type of incident, and the amount of damage. Notifications 306 may be transmitted to relevant parties such as owners, passengers, emergency services (e.g., police, fire, and/or ambulance), government authorities (e.g., highway patrol, department of transportation, bureau of motor vehicles, etc.), or manufacturers. In addition to damage to vehicle 102, damage to other vehicles and/or harm to others (e.g., pedestrians, property, etc.) is determined. In the exemplary embodiment, damage detected 304 is analyzed to determine a level and/or type of damage. For example, damage detected 304 may be cosmetic damage to vehicle 102, disablement of vehicle 102, injury to the passengers, injury to pedestrians, damage to other vehicles, and/or damage to other properties. In some embodiments, a high degree of damage such as loss of life and/or severe injury may be determined to be critical data 308.

In the exemplary embodiment, IMS 202 determines a response by analyzing the damage detected 304. In some embodiments, the response may include identifying legal requirements 310. For example, legal requirements 310 may include swapping insurance information 312 with all parties involved in incident 100. In some embodiments, legal requirements 310 may include reporting incident 100 to government authorities.

In the exemplary embodiment, IMS 202 may initiate an emergency response 314. IMS 202 may transmit notifications 306 to nearby emergency services including critical data 308 to initiate emergency response 314. Initiating emergency response 314 may include determining the location of incident 101 and determining the nearest emergency services. IMS 202 may also determine which emergency services are required. For example, if injuries are present, emergency response 314 may also include a request for medical assistance. Critical data 308 may include information related to a medical and/or injury assessment based on sensor data. For example, sensors 204 may be capable of detecting and monitoring heart rates, blood pressure, and/or other vital data. Other data such as visual analysis based on cameras may also be used to determine the extent of injury. Sensors 204 may also be used to detect evolving hazards such as fire and/or the potential for fire (e.g., a fuel line is leaking and fuel is spreading towards a flame). In such cases, notifications 306 may include a request for a fire department response. In some cases, critical data 308 may include information related to the type of fire. For example, if certain chemicals were being transported and are aflame, the type of chemical may be included in critical data 308 to apprise responders to prepare based on the emergency.

In some embodiments, critical data 308 may include autonomous vehicle sensor data for a period of time before a vehicle collision or accident. For instance, vehicle-mounted sensors (including internally and externally facing cameras) as well as mobile device sensors, may generate sensor data, including digital images. The sensor data generated 15 seconds prior to the vehicle collision and during the vehicle collision may be collected and transmitted to a remote server for processor analysis and processor determination of how severe the vehicle collision was and whether the autonomous vehicle is still serviceable. The processor analysis of the sensor data generated prior to, during, and/or after the vehicle collision may determine the extent of damage to the autonomous vehicle and/or the extent of injuries to passengers.

In the exemplary embodiment, IMS 202 may also initiate communication with 911 emergency services 316 and allow users and/or passengers of vehicle 102 to speak to emergency services operators. 911 emergency services 316 may be initiated using any method of communication such as cellular, Wi-Fi, satellite, and/or any other method of communication capable of transmitting and receiving audio and/or visual communication with emergency services. In some embodiments, vehicle 102 may be specially equipped to initiate an emergency message. For example, vehicle 102 may transmit a predetermined message and/or emergency signal (e.g., a beacon) capable of being detected by emergency services.

In the exemplary embodiment, IMS 202 may collect data 318 including at least data related to the emergency response. Collecting data 318 may include information related to the type of emergency services responding to incident 100. In some embodiments, collecting data 318 may include whether the emergency response includes removal and/or relocation of vehicle 102. In some cases, emergency responders may cause additional damage to vehicle 102 and collecting data 318 may further include additional damage analysis.

IMS 202 may determine from damage detected 304 that roadside assistance 320 is needed. Roadside assistance 320 may include determining the type of service needed. In some embodiments, roadside assistance 320 may include determining that vehicle 102 is disabled and that a tow 322 may be required. In the exemplary embodiment, IMS 202 determines the nearest tow facility for tow 322 and automatically transmits a request to the identified tow service provider. IMS 202 may include in the request the location information for incident 100 and the destination that vehicle 102 is to be towed to. In some embodiments, tow 322 may also include handling financial transactions such as automatic payment to the identified tow service provider. IMS 202 may also determine the type of tow required. For example, vehicle 102 may be an all-wheel-drive vehicle and require a flatbed and/or vehicle 102 may be damaged in a manner that requires a flatbed.

In the exemplary embodiment, IMS 202 may initiate a repair 324 at a repair facility. In some embodiments, IMS 202 may determine an appropriate repair facility and/or may include a specific repair request. In some embodiments, IMS 202 retrieves vehicle information and parts information to determine appropriate parts needed for repair 324. In some embodiments, IMS 202 may automatically order the parts to be delivered to the determined repair facility. In some embodiments, IMS 202 may also retrieve repair instructions and/or identify mechanics capable of performing repair 324.

In the exemplary embodiment, IMS 202 initiates a process to recertify 326 vehicle 102 to allow vehicle 102 to return to normal on-road operation. As explained above, vehicles involved in accidents, collisions, or other incidents that lead to operational failure may be required to undergo recertification after repairs have been performed. Recertification of a vehicle for road-worthiness may be dependent on specific regulations and may vary based on different jurisdictions. In the exemplary embodiment, IMS 202 may retrieve the rules for vehicle 102 based on the geographical region in which vehicle 102 operates. Recertification may be performed according to the retrieved rules.

In the exemplary embodiment, recertification 326 may be performed by an auditor, shown in FIG. 4 and described in more detail below. In the exemplary embodiment, roadside assistance 320, tow 322, repair 324, and recertify 326 may be performed by separate entities, each of which may be in communication with IMS 202 and may transmit data related to the functions performed by each entity back to IMS 202 for recordation, analysis, and verification purposes as a part of the process to recertify 326 vehicle 102. Recertify 326 may include multiple steps performed by multiple parties as discussed further below.

In the exemplary embodiment, IMS 202 may inform owners 328 of incident 100. In the exemplary embodiment, IMS 202 may transmit notifications 306 when incident occurs 302. Notifications 306 may include critical data 308 as described above. Informing owners 328 may also include procedures performed in legal requirements 310 and swapping insurance information 312 in addition to steps performed in emergency response 314 and roadside assistance 320. Informing owners 328 may further include any additional necessary and/or useful information to facilitate informed decision-making to manage incident 100. In some embodiments, IMS 202 may stream data 330 to owners regarding incident 100. For example, sensors 204 may include cameras and other sensors that may enable owners to independently assess incident 100. Sensor data from sensors 204 may be streamed to owners via the Internet, for example, or by any other means of communication of streaming data.

Exemplary Recertification Process

Figure 4:
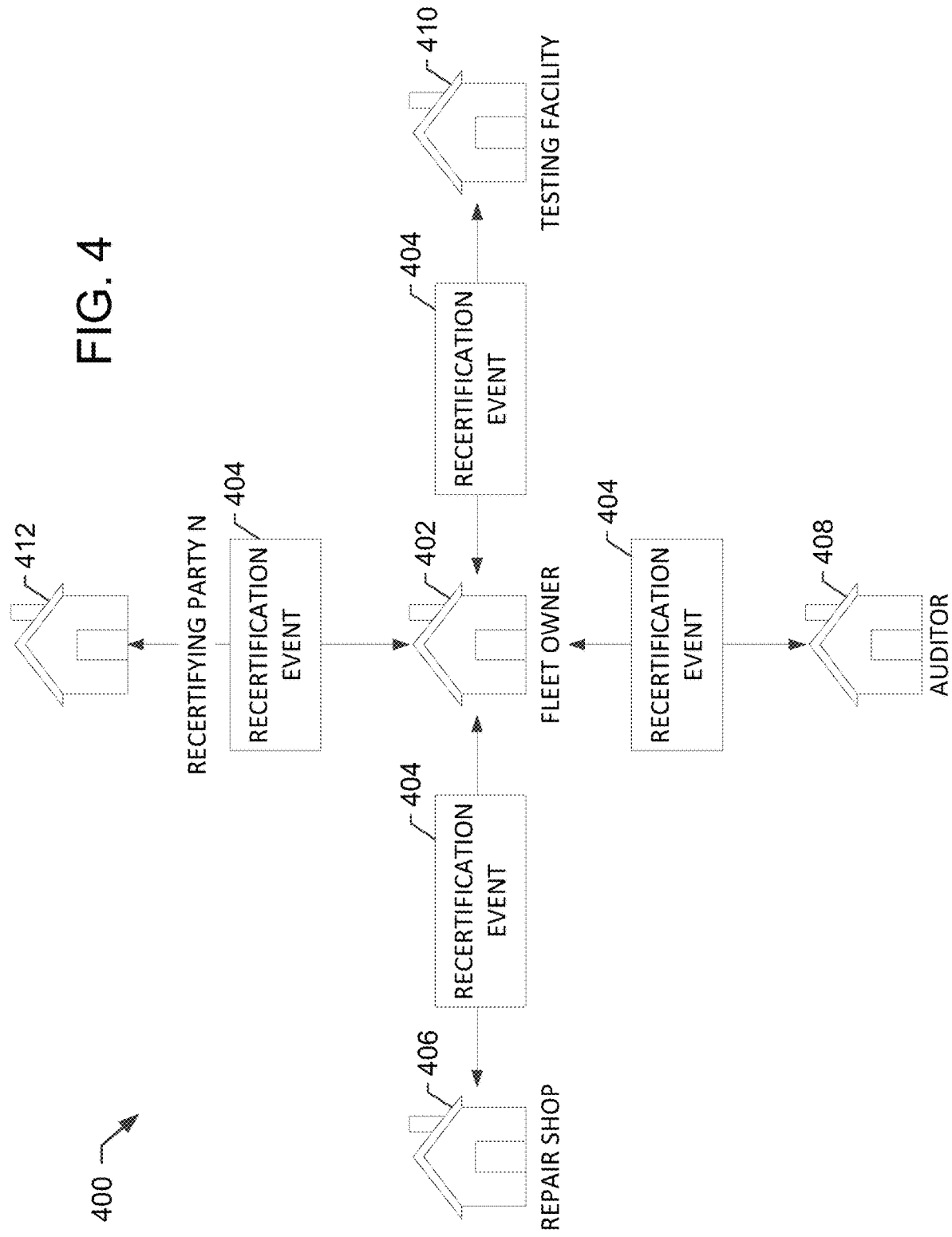
FIG. 4 illustrates an exemplary data flow diagram of an exemplary system for recertifying an autonomous vehicle to an operational state shown in FIG. 3.

FIG. 4 illustrates an exemplary data flow diagram 400 of an exemplary system for recertifying 326 an autonomous vehicle to an operational state as shown in FIG. 3. In the exemplary embodiment, vehicle 102, shown in FIG. 1, is owned and operated by a fleet owner 402. Fleet owner 402 may operate multiple vehicles. In the exemplary embodiment, fleet owner 402 may subscribe for services with IMS 202 by registering vehicle 102 with IMS 202. Registration of vehicle 102 may include uploading and/or otherwise transmitting relevant data associated with vehicle 102 to IMS 202. As described above, vehicle 102 may be involved in incident 100 and require incident management with IMS 202. Upon repair and restoration, vehicle 102 may require recertification.

In the exemplary embodiment, recertification of vehicle 102 may include multiple recertification events 404. Recertification events 404 may be recorded in an electronic transparent ledger system such as a blockchain described elsewhere herein. In some embodiments, fleet owner 402 may coordinate and/or record data from recertification events 404. In the exemplary embodiment, IMS 202, shown in FIG. 2, may coordinate recertification events 404 and transmit and/or update fleet owner 402 on the status of each recertification event 404. In some embodiments, fleet owner 402 may internally host IMS 202, and/or fleet owner 402 and IMS 202 may be the same entity.

In the exemplary embodiment, multiple entities may be included in the recertification process. Each entity may be associated with a recertification event. For example, during repair 324, shown in FIG. 3, repair shop 406 may perform repairs on vehicle 102. Repair shop 406 may record data associated with the repair performed such as type of repair performed, labor, parts, costs, repair personnel and repair procedures. Repair data may be transmitted to IMS 202 and/or fleet owner 402. In the exemplary embodiment, vehicle 102 may be transported to a testing facility 410 to perform diagnostics and testing on vehicle 102 following repair 324. Testing facility 410 may evaluate components including mechanical, electrical, communication, controls, and autonomous testing. In some embodiments, tests performed may be limited to functionality repaired by repair shop 406. In some embodiments, testing facility 410 may perform comprehensive tests on vehicle 102 to determine operational performance capabilities. In the exemplary embodiment, testing facility 410 records testing data such as test procedures, performance results, and the like and transmits them to IMS 202 and/or fleet owner 402.

In some embodiments, a number of other parties may be involved in the recertification process. For example, in some embodiments, recertifying parties may be configured to receive and evaluate repair and testing records generated by repair shop 406 and testing facility 410. In other embodiments, government and/or other regulatory entities may require examination and/or inspection of vehicle 102. In some embodiments, non-government entities may be authorized to perform functions such as emissions testing, battery testing, noise and pollution testing, and/or safety testing. In the exemplary embodiment, a recertifying party N 412 may receive records transmitted by fleet owner 402. In some embodiments, IMS 202 transmits records to recertifying party N 412 as described above. In the exemplary embodiment, recertifying party N 412 may perform additional procedures on vehicle 102 including procedures to return vehicle 102 to operating conditions.

Exemplary Recertification Data Flow

Figure 5:
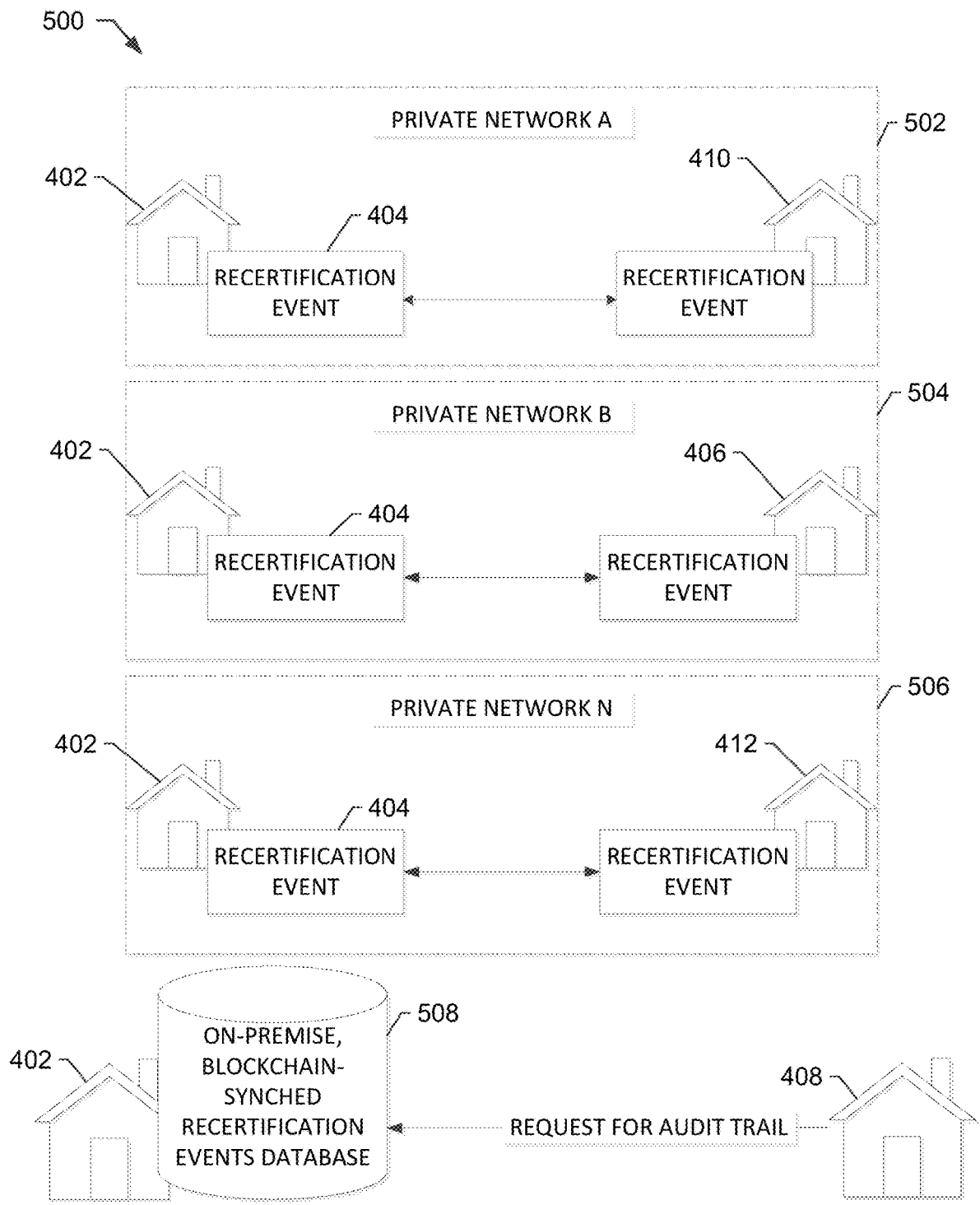
FIG. 5 illustrates an exemplary alternative perspective of data flow diagram 400 shown in FIG. 4.

FIG. 5 illustrates an exemplary alternative perspective data flow 500 of data flow diagram 400 shown in FIG. 4. In particular, alternative perspective data flow 500 is an exemplary embodiment using independent private networks. In the exemplary embodiment, fleet owner 402 (shown in FIG. 4) initiates testing of vehicle 102 (shown in FIG. 1) and transmits data associated with vehicle 102 to recertifying parties such as repair shop 406, testing facility 410, and/or recertifying party N 412 (all shown in FIG. 4). In the exemplary embodiment, data associated with vehicle 102 is formatted recertification event 404 (shown in FIG. 4) as described above. Testing facility 410 receives vehicle 102 and associated data for vehicle 102 and may conduct testing on vehicle 102 as described above. In the exemplary embodiment, transfer of information is conducted via private network A 502. Private network A 502 may be any type of network capable of data transfer including, for example, electronic data transmissions across a network such as the Internet and configured for secure communication using encryption and/or tunneling technologies such as a virtual private network (VPN). In some embodiments, private network A 502 may be a secure network such as a VPN and/or employ other secure technologies such as tunneling and/or encryption. In some embodiments private network A 502 may be agnostic of underlying structures. For example, cellular, satellite, and/or other communication media may be configured to host private network A 502. In the exemplary embodiment, private network A 502 may be capable of transmitting blockchains between entities using IMS 202 (shown in FIG. 2).

In the exemplary embodiment, fleet owner 402 may use a separate private network B 504 to communicate with repair shop 406. As similarly described above, fleet owner 402 may initiate a recertification event 404 and transmit and receive associated data accordingly to repair shop 406. Additionally, or alternatively, fleet owner 402 may initiate recertification events 404 to recertifying party N 412 via private network N 506 in a similar fashion as describe above for private network A 502 and private network B 504.

In the exemplary embodiment, fleet owner 402 may employ the use of a specialized on-premise, blockchain-synched recertification events database 508. In some embodiments events database 508 may employ the use of specialized encryption software to secure the recertification events 404. Use of specialized blockchain encryption may allow rapid analysis of recertification events to confirm vehicle 102 has undergone required procedures. Events database 508 may also be configured in a manner that enables improved access and transparency for evaluation of recertification events. In some embodiments events database 508 may be hosted remotely (e.g., a cloud configuration). In the exemplary embodiments, auditor 408 (shown in FIG. 4) may request access to events database 508 to perform an audit of recertification events 404 to determine whether vehicle 102 has undergone necessary steps for recertification. Analysis of data stored in events database 508, auditor 408 may approve or deny certification of vehicle 102 and/or a return to service and/or operational status.

Exemplary Incident Management System

Figure 6:
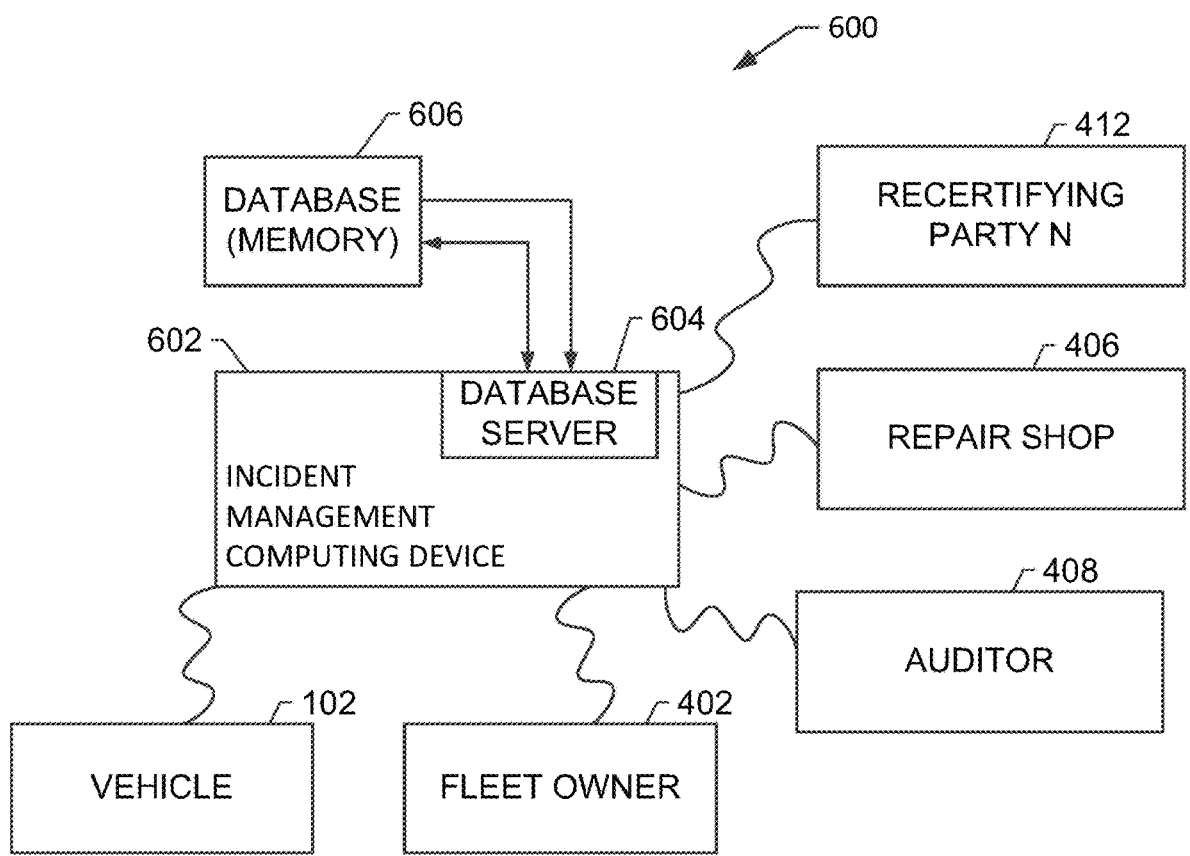
FIG. 6 is a simplified block diagram of the IMS shown in FIG. 2.

FIG. 6 is a simplified block diagram 600 of IMS 202 shown in FIG. 2. In the exemplary embodiment, IMS 202 includes an incident management (IM) computing device 602. Incident management computing device 602 may include a database 604. Database 604 may be specialized on-premise, blockchain-synched recertification events database 508 (shown in FIG. 5), as described above. In the exemplary embodiment database server 604 may be in communication with database (e.g., a memory storage area) 606. Database 606 may store recertification events 404 as described above.

In the exemplary embodiment, incident management computing device 602 may be in communication with vehicle 102 (shown in FIG. 1), fleet owner 402, repair shop 406, auditor 408, and/or recertifying party 412 (all shown in FIG. 4). In some embodiments, incident management computing device 602 may be in further communication with other entities and/or computing devices described elsewhere herein such as government agencies, passengers, manufacturers, etc.

Exemplary Incident Management Computing Device

Figure 7:
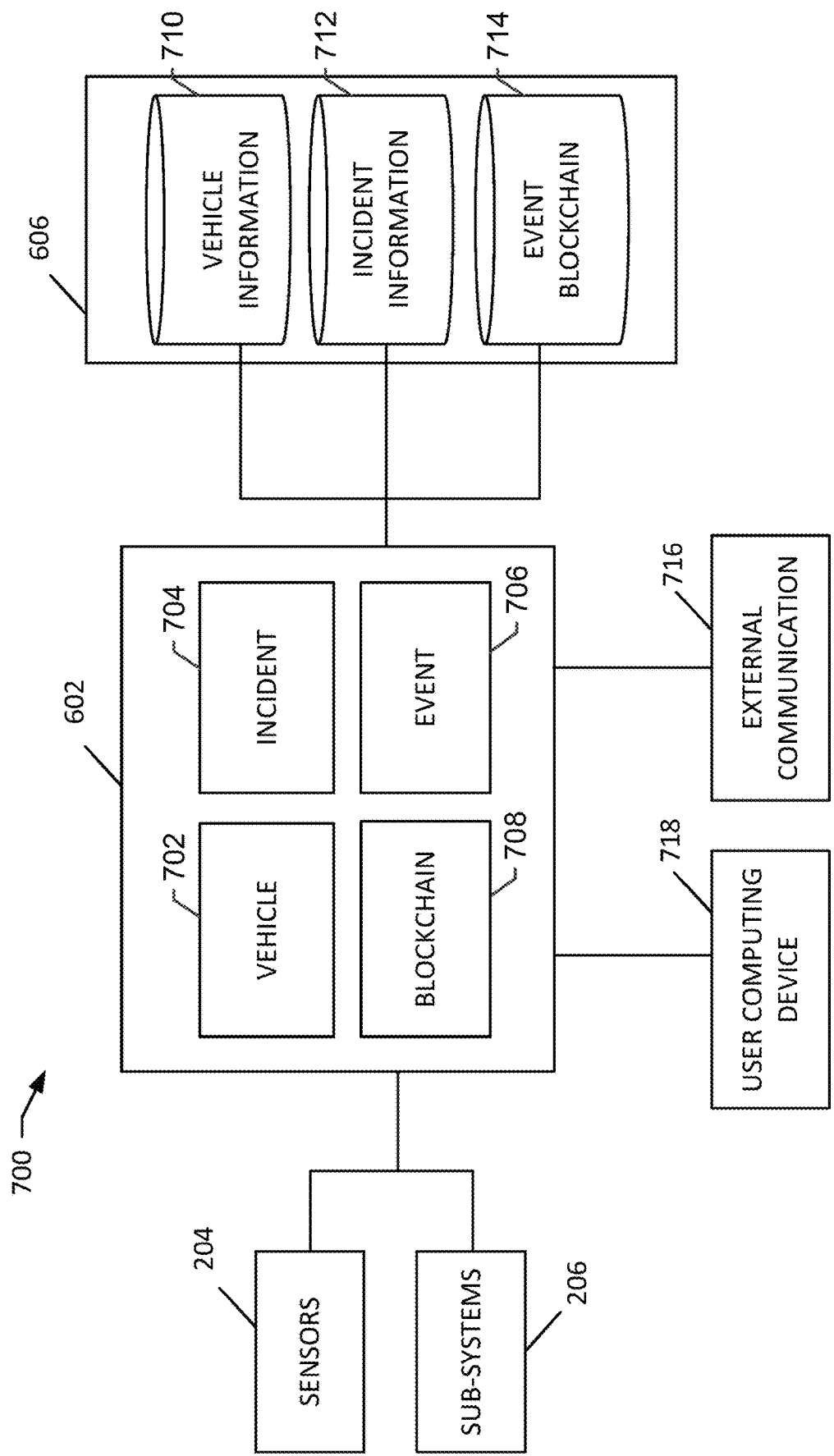
FIG. 7 illustrates an exemplary configuration of incident management computing device shown in FIG. 6.

FIG. 7 illustrates an exemplary configuration 700 of incident management (IM) computing device 602 shown in FIG. 6. In the exemplary embodiment, IM computing device 602 may include a vehicle module 702 for processing vehicle information. IM computing device 602 may also include an incident module 704 for processing incident data. IM computing device 602 may also include an event module 706 for processing events such as recertification event 404 (shown in FIG. 4). IM computing device 602 may also include a blockchain module 708 for processing blockchains as described above. IM computing device 602 is not limited to these modules and may include additional or alternative modules for performing the functions and capabilities as described elsewhere herein.

In the exemplary embodiment, IM computing device 602 may be in communication with a database and/or a memory storage such as database 606 as shown in FIG. 6. In the exemplary embodiment, IM computing device 602 may retrieve from and/or store to database 606 vehicle information 710, incident information 712, and/or event blockchains 714. Vehicle information 710 may include, for example, make, model, year, mechanical specifications, operational history, owner, passengers, and the like. Incident information 712 may include, for example, location, time, date, damage analysis, sensor data, etc. Event blockchain 714 may include a transparent, easily accessible record of events associated with vehicle 102 (shown in FIG. 1), such as recertification event 404.

In the exemplary embodiment, IM computing device 602 may be configured for communication 716 with remote parties and/or computing devices such as fleet owner 402, repair shop 406, auditor 408, and recertifying party N 412 (all shown in FIG. 4). External communication 716 may include various transmitters and receivers and/or specific communication modules capable of transmitting and receiving messages from remote computing devices as described herein. For example, external communication 716 may include a wireless transmitter capable of transmitting shortwave and/or longwave radio frequency signals along the electro-magnetic frequency spectrum using embedded signal processing and/or other radio transmission methods.

In the exemplary embodiment, IM computing device 602 may also display, on a user computing device 718, relevant information related to incident management process. In some embodiments, user computing device 718 may be configured to display a graphical user interface to a passenger and/or owner of vehicle 102. In some embodiments, IM computing device 602 may cause user computing device 718 to prompt a passenger of vehicle 102 to input information. For example, if sensors 204 (shown in FIG. 2) are damaged or unable to detect damage and/or injury, user computing device 718 may be used to request information from passengers and/or other individuals (e.g., responding emergency personnel, bystanders, other computing devices capable of interacting with user computing device 602, etc.). In some embodiments, user computing device 718 may be used to input commands to instruct IM computing device 602 to perform certain functions. For example, a user (e.g., a repair technician, an auditor, and/or a recertifying part) may desire certain diagnostics be performed on vehicle 102. In some embodiments, user computing device 718 may be used to cause IM computing device 602 to automatically contact and communication with emergency responders, fleet owner 402, manufacturers, government authorities, etc. User computing device 718 may also perform other functions requiring interaction with passengers and/or fleet owner 402 such as registration and configuration of IM computing device 602 with vehicle 102.

In the exemplary embodiment, IM computing device 602 may be in communication with sensors 204 and sub-systems 206 (both shown in FIG. 2). For example, IM computing device 602 may receive sensor information 204 from vehicle 102 and analyze the sensor information to, for example, determine damage related to incidents. IM computing device 602 may also cause sub-systems 206 to initiate diagnostics as described above and transmit vehicle operation data to IM computing device 602.

Exemplary Data Structure

Figure 8:
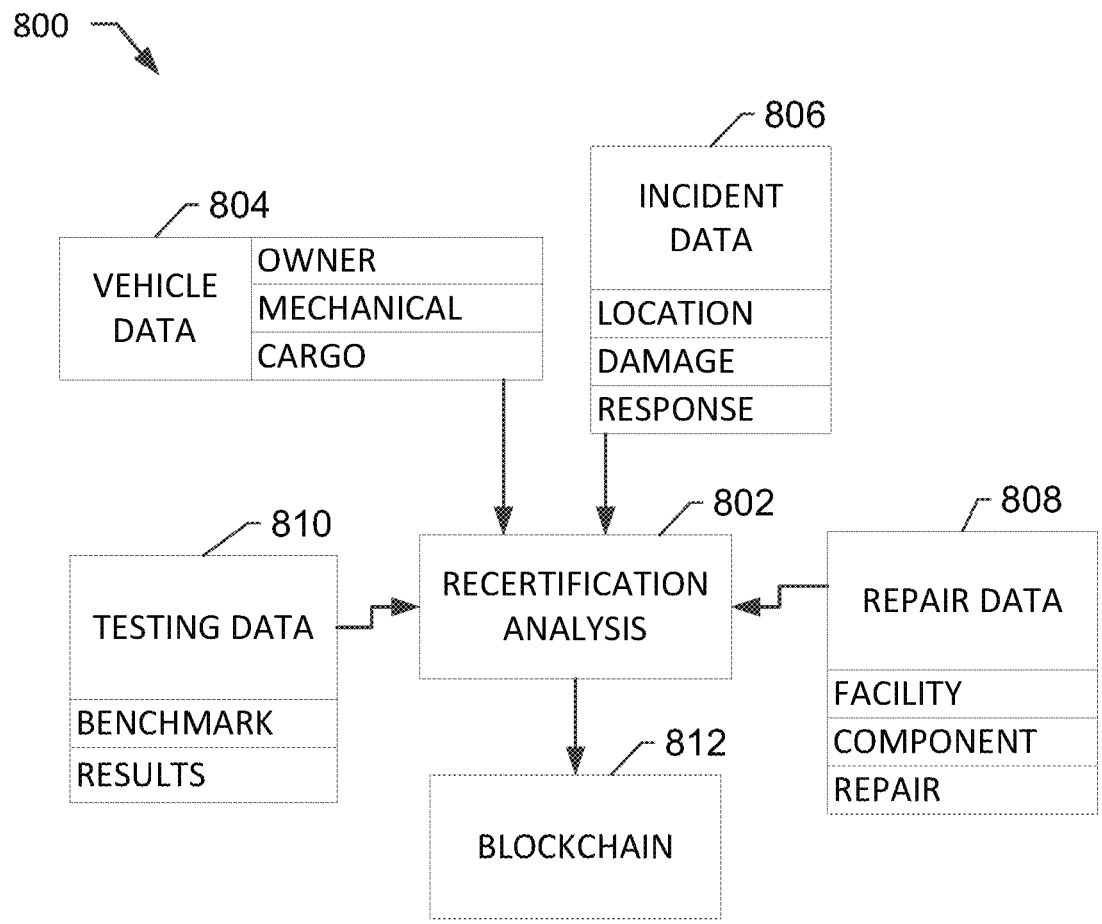
FIG. 8 illustrates an exemplary process for generating a data structure for recertification shown in FIG. 3.

FIG. 8 illustrates an exemplary process 800 for generating a data structure 802 for recertification shown in FIG. 3. In the exemplary embodiment, data structure 802 is generated by a recertification analysis process. The recertification analysis process may include receiving, analyzing, and storing multiple sets of data. In the exemplary embodiment, data structure 802 may be stored in database 606 (shown in FIG. 6). In the exemplary embodiment, vehicle data 804 associated with vehicle 102 (shown in FIG. 1) may be stored in data structure 802. Incident data 806, including data related to event recertification 404 (shown in FIG. 4), may be stored in data structure 802. Repair data 808, generated by repair shop 406 (shown in FIG. 4), may be stored in data structure 802. Testing data 810, generated by testing facility 410 (shown in FIG. 4), may be stored in data structure 802. In the exemplary embodiment, data structure 802 may be transformed into a blockchain 812. Blockchain 812, as described above, may be an electronic (e.g., digital) transparent ledger stored synchronously across a blockchain network made up of servers called nodes. In the exemplary embodiment, blockchain 812 may record periodic events associated with vehicle 102.

Exemplary Computer System

Figure 9:
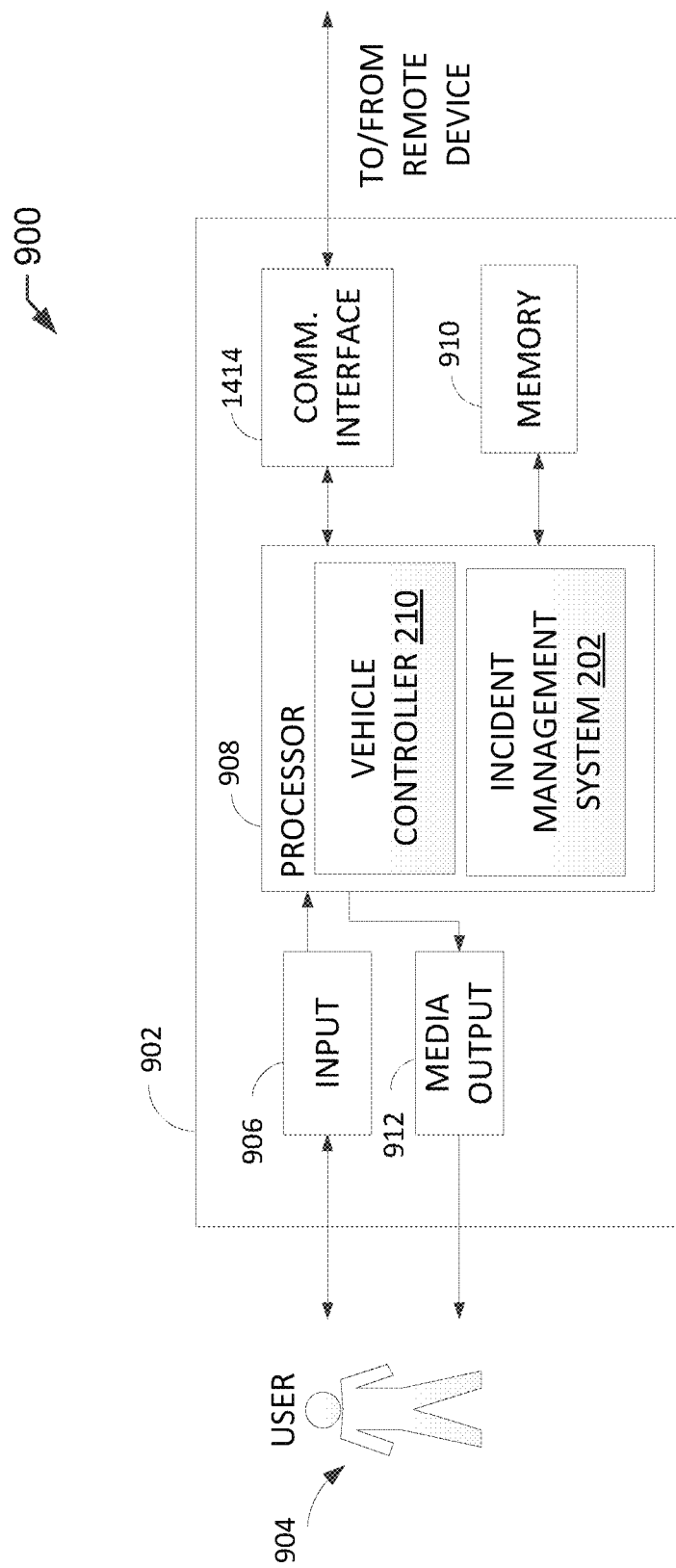
FIG. 9 illustrates an exemplary configuration of an exemplary user computing device shown in FIG. 7.

FIG. 9 illustrates an exemplary configuration 900 of an exemplary user computing device 902. In some embodiments, user computing device 902 may be user computing device 718 (shown in FIG. 7). In the exemplary embodiment, user 904 interacts with user computing device 902. In some embodiments, as described above, user computing device 902 may be a control panel on vehicle 102 (shown in FIG. 1). In other embodiments, user computing device 902 may be an independently operated computing device such as a mobile device, table, laptop, or desktop computer.

In the exemplary embodiment, user computer device 902 may receive input from user 904 via an input module 906. User computer device 902 may be configured to communicate with vehicle controller 210 and may include a processor 908 for executing instructions. In some embodiments, executable instructions may be stored in a memory area 910. Processor 908 may include one or more processing units (e.g., in a multi-core configuration). Memory area 910 may be any device allowing information such as executable instructions and/or transaction data to be stored and retrieved. Memory area 910 may include one or more computer-readable media. User 904 may be any individual using vehicle 102 and may be passengers, owners, licensed and/or authorized pilots, mechanics, maintenance personnel, government officials, and/or manufacturers.

User computer device 902 may include at least one media output component 912 for presenting information to users. Media output component 912 may be any component capable of conveying information to user 904. In some embodiments, media output component 912 may include an output adapter (not shown), such as a video adapter and/or an audio adapter. An output adapter may be operatively coupled to processor 908 and operatively coupleable to an output device, such as a display device (e.g., a cathode ray tube (CRT), liquid crystal display (LCD), light emitting diode (LED) display, or "electronic ink" display) or an audio output device (e.g., a speaker or headphones).

In some embodiments, media output component 912 may be configured to present a graphical user interface (e.g., a web browser and/or a client application) to user 904. A graphical user interface may be configured to display, for example, routing information, diagnostic information, vehicle performance information (e.g., energy levels, maintenance information, etc.), communication information (e.g., signal strength, bandwidth, latency, etc.).

In some embodiments, user computer device 902 may include an input device for receiving input from user 904. User 904 may use input devices to, without limitation, interact with vehicle 102 or IMS 202 (shown in FIG. 2). Input devices may include, for example, a keyboard, a pointing device, a mouse, a stylus, and/or a touch sensitive panel (e.g., a touch pad or a touch screen). A single component, such as a touch screen, may function as both an output device of media output component 912 and an input device. User computer device 902 further may include at least one sensor, including, for example, a gyroscope, an accelerometer, a position detector, a biometric input device, a telematics data collection device, and/or an audio input device.

Stored in memory area 910 may be, for example, computer-readable instructions for providing a user interface to user 904 via media output component 912 and, optionally, receiving and processing input from an input device using input module 906. The user interface may include, among other possibilities, a web browser and/or a client application. Web browsers enable users, such as user 904, to display and interact with media and other information typically embedded on a web page or a website hosted by a service provider and/or user computer device 902. For example, instructions may be stored by a cloud service and the output of the execution of the instructions sent to the media output component 912.

Exemplary Process for Responding to an Incident

Figure 10:
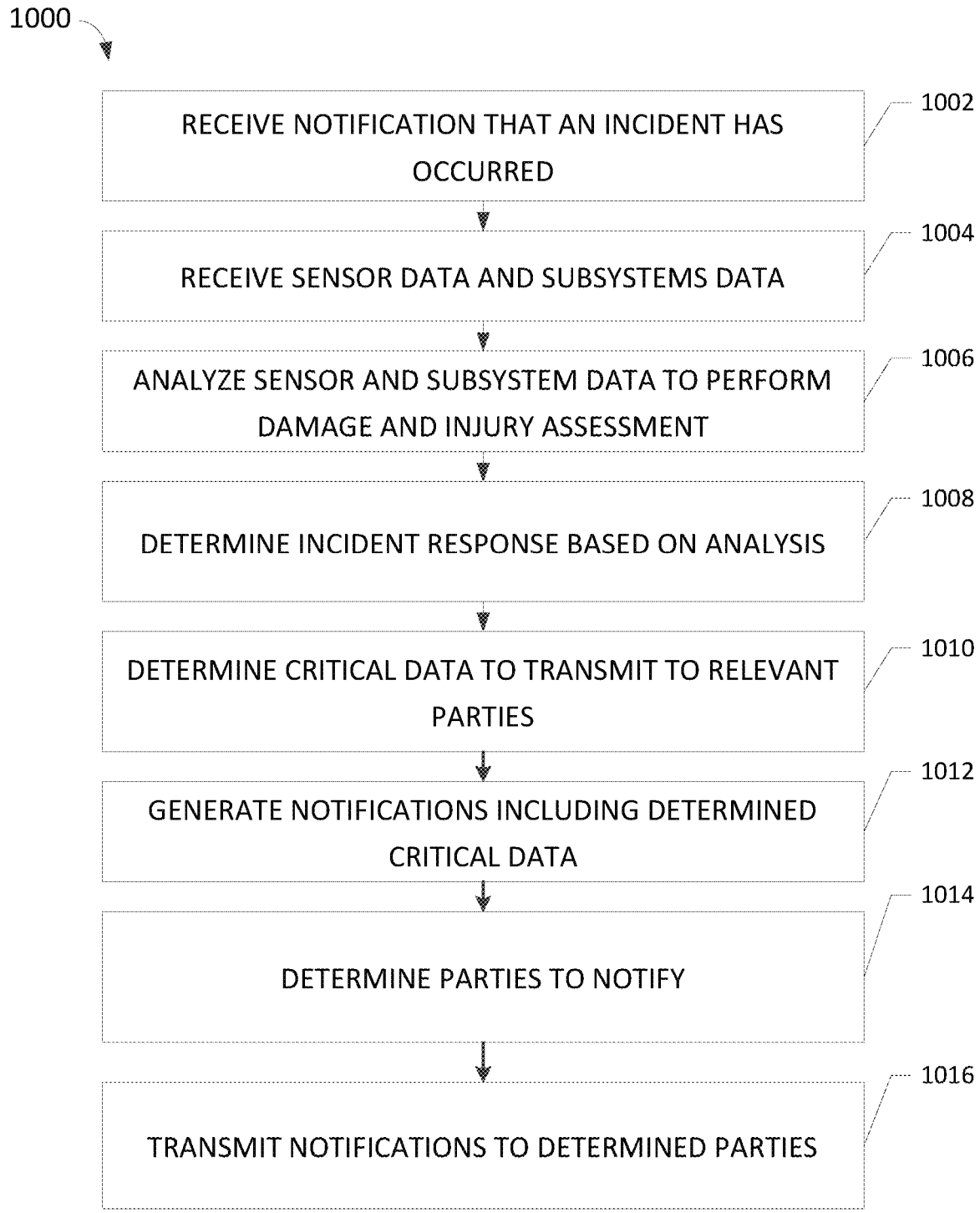
FIG. 10 illustrates a flow chart of an exemplary process for responding to incident shown in FIG. 1.

FIG. 10 illustrates a flow chart of an exemplary process 1000 for responding to incident 100 (shown in FIG. 1) using IMS 202 (shown in FIG. 2). In the exemplary embodiment, process 1000 may include receiving 1002 a notification that an incident has occurred. Process 1000 may further include receiving 1004 sensor data and sub-systems data from vehicle 102 (shown in FIG. 1). Process 1000 may also include analyzing 1006 sensor and sub-system data. Process 1000 may also include determining 1008 an incident response based on the analysis. Process 1000 may further include determining 1010 critical data to transmit to relevant parties. Process 1000 may also include generating 1012 notifications including the determined critical data. Process 1000 may also include determining 1014 parties to notify. Process 1000 may also include transmitting 1016 the notifications to the determined party. Exemplary process 1000 may also include additional steps not explicitly described herein.

Exemplary Process for Recertification

Figure 11:
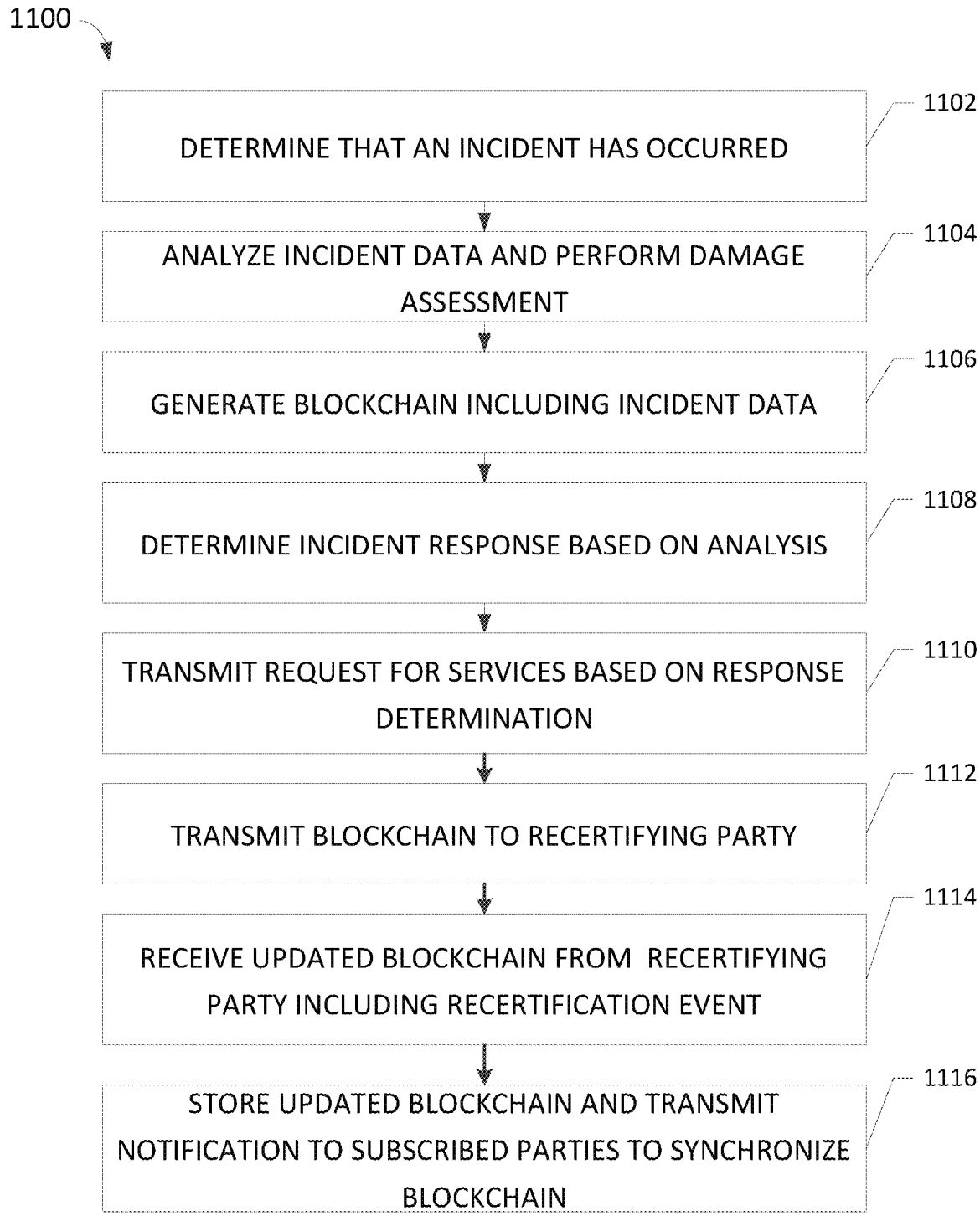
FIG. 11 illustrates a flow chart of an exemplary process for managing the recertification process shown in FIG. 3.

FIG. 11 illustrates a flow chart of an exemplary process 1100 for recertifying a vehicle 102 shown in FIG. 1. In the exemplary embodiment, process 1100 may include determining 1102 that an incident has occurred. Process 1100 may further include analyzing 1104 incident data and performing a damage and/or injury assessment. Process 1100 may also include generating a blockchain including the incident data. Process 1100 may also include determining 1108 an incident response based on the analysis 1104. Process 1100 may further include transmitting 1110 requests for services based on the determined 1108 incident response. Process 1100 may also include transmitting 1112 a blockchain to identified recertifying parties. Process 1100 may further include receiving 1114 an updated blockchain from the recertifying party including recertification event data. Process 1100 may also include storing 1116, the received 1114 updated blockchain and transmitting a notification to subscribed parties to synchronize blockchains.

EXEMPLARY EMBODIMENTS & FUNCTIONALITY

In one aspect, an incident management system for managing an incident response may be provided. The incident management system may include at least one incident management (IM) computing device. The IM computing device may be in communication with at least one vehicle. The IM computing device may include at least one processor and at least one memory device, wherein the at least one processor is programmed to receive, from the vehicle, a notification that an incident has occurred, the notification including sensor data and sub-system data. The at least one processor may also be programmed to analyze the sensor data and sub-systems data to determine an incident response, the determination of the incident response including categorizing the incident based at least on a type of damage determined from the sensor data and sub-systems data. The at least one processor may also be programmed to identify at least one responding party based on the determined incident response, wherein the identifying of the at least one responding party is based on at least the category of the incident. The at least one processor may also be programmed to parse the sensor data and sub-systems data to generate a set of critical data to transmit to the at least one responding party, the set of critical data based on the at least one responding party. The at least one processor may also be programmed to transmit a message to the at least one responding party including at least the determined set of critical data and a location of the vehicle.

One enhancement may be where the processor of the incident management system may be further programmed to transmit a command to the vehicle to cause sub-systems of the vehicle to perform a self-diagnostic and transmit self-diagnostic results to the IM computing device. A further enhancement may be where the self-diagnostic result includes a determination that the vehicle is disabled and where the responding party is a tow service.

Another enhancement may be where analyzing the sensor data includes determining whether injuries are present and where the set of critical data includes the sensor data associated with the injuries. In another enhancement, the responding party is at least one of emergency services, tow services, a fleet owner, a repair facility, and a manufacturer.

A further enhancement may be where identifying the responding party includes receiving the location of the vehicle and retrieving, from a database, relevant parties within a geographic threshold.

Another enhancement may be where the incident response is one of swapping insurance information, contacting emergency services, requesting roadside assistance, requesting tow service, requesting repair services, recertifying the vehicle for operation, and informing owners of the incident.

In another aspect, an incident management system for managing an incident response is provided. The incident management system may include at least one incident management (IM) computing device. The IM computing device may be in communication with at least one vehicle. The IM computing device may include at least one processor and at least one memory device. The at least one processor may be programmed to determine that an incident associated with the vehicle has occurred. The at least one processor may also be programmed to analyze incident data received from the vehicle including at least sensor data and sub-system data to perform a damage assessment to determine an incident response. The at least one processor may also be programmed to generate a blockchain including the incident data and the damage assessment. The at least one processor may also be programmed to identify at least one recertifying party based on the determined incident response and transmit the blockchain and a request for services to the at least one recertifying party. The at least one processor may also be programmed to receive from the at least one recertifying party an updated blockchain including at least recertification event data, the recertification event data including procedures performed on the vehicle. The at least one processor may also be programmed to store the updated blockchain associated with the vehicle in a recertification events database.

In one enhancement, the recertifying party may be one of a repair shop, an auditor, and a testing facility. In another enhancement, the processor may be further programmed to retrieve the updated blockchain from the recertification events database and transmit the blockchain to a recertifying party. In yet another enhancement, generating a blockchain may further include creating a data structure including the incident data, the damage assessment, repair data, and test data, and storing the data structure in a block of the blockchain. In a further enhancement, the blockchain may be stored in a node of a distributed blockchain network accessible to the at least one recertifying party.

In another enhancement, the processor may be further programmed to perform an audit of the blockchain to determine that the vehicle is recertified. The processor may perform the audit by retrieving the blockchain associated with the vehicle from the recertification events database. The processor may be further programmed to analyze at least one block in the blockchain to identify the at least one recertifying party and the procedures performed by the recertifying party on the vehicle. The processor may be further programmed to cross-referencing the procedures performed by the recertifying party with stored performance procedures to verify the procedures performed exceed a predetermined performance threshold.

In yet another enhancement, cross-referencing the procedures performed may further include retrieving from a database, a predefined set of procedures associated with at least one rule required for performing each procedure of the predefined set of procedures, and comparing the at least one block in the blockchain to determine whether the at least one rule was applied correctly.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics and information, historical estimates, and/or actual repair costs. The machine learning programs may utilize deep learning algorithms that may be primarily focused on pattern recognition, and may be trained after processing multiple examples. The machine learning programs may include Bayesian Program Learning (BPL), voice recognition and synthesis, image or object recognition, optical character recognition, and/or natural language processing—either individually or in combination. The machine learning programs may also include natural language processing, semantic analysis, automatic reasoning, and/or machine learning.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the object, vehicle, user, damage, needed repairs, costs and/or incident from vehicle data, insurance policies, geolocation data, image data, and/or other data.

Based upon these analyses, the processing element may learn how to identify characteristics and patterns that may then be applied to analyzing image data, model data, and/or other data. For example, the processing element may learn, with the user's permission or affirmative consent, to identify the type of incident that occurred based upon images of the resulting damage. The processing element may also learn how to identify damage that may not be readily visible based upon the received image data.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), SD card, memory device and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. The following detailed description illustrates embodiments of the disclosure by way of example and not by way of limitation. It is contemplated that the disclosure has general application to providing an on-demand ecosystem in industrial, commercial, and residential applications.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer system comprising at least one computing device comprising at least one processor and at least one memory device, the at least one computing device in communication with at least one vehicle control system of an autonomous vehicle, a plurality of recertifying computing devices, and a plurality of roadside assistance facilities computing devices, wherein the at least one processor is configured to:
   receive, from the at least one vehicle control system, incident data associated with an incident involving the autonomous vehicle;
   determine a damage to the autonomous vehicle associated with the incident by analyzing the incident data;
   generate, based upon the determined damage, an incident response indicating required repairs for recertifying the autonomous vehicle for operation;
   identify, based upon the incident response and a location of the autonomous vehicle, (i) a recertifying party associated with at least one of the plurality of recertifying computing devices, the recertifying party eligible to carry out the required repairs on the autonomous vehicle, and (ii) a roadside assistance facility associated with at least one of the plurality of roadside assistance facilities computing devices, the roadside assistance facility identified to transport the autonomous vehicle to the recertifying party;
   receive recertification data from the at least one recertifying computing device;
   determine, based upon the recertification data, that the required repairs were performed on the autonomous vehicle; and
   recertify the autonomous vehicle for on-road operation based upon determining that the required repairs were performed on the autonomous vehicle.

2. The computer system of claim 1, wherein the incident response further indicates a list of requirements associated with the incident to be satisfied, and wherein the at least one processor is further configured to satisfy the requirements by performing at least one of:
   transmitting data associated with the autonomous vehicle to each party involved in the incident; or
   transmitting a report to local authorities that the incident occurred.

3. The computer system of claim 1, wherein the at least one processor is further configured to transmit, to the roadside assistance facility, a transport request to transport the autonomous vehicle to the recertifying party, the transport request including the location of the autonomous vehicle and a location of the recertifying party.

4. The computer system of claim 1 further comprising the autonomous vehicle, wherein the autonomous vehicle comprises a plurality of sensors configured to collect the incident data including sub-system data of the autonomous vehicle, and wherein the vehicle control system is configured to determine that the incident has occurred.

5. The computer system of claim 1, wherein the at least one processor is further configured to:
receive, from the at least one recertifying computing device, an updated blockchain including the recertification data, the recertification data including procedures performed on the autonomous vehicle; and
store the updated blockchain associated with the autonomous vehicle in a recertification events database.

6. The computer system of claim 1, wherein the at least one processor is further configured to:
generate a block on a blockchain by creating a data structure including the incident data, damage data associated with the determined damage, repair data, and test data; and
store the blockchain in a database.

7. The computer system of claim 1, wherein the at least one processor is further configured to store at least one block in a node of a distributed blockchain network accessible to the at least one recertifying computing device.

8. A computer-implemented method implemented using a computer system including at least one computing device that includes at least one processor and at least one memory device, the at least one computing device in communication with at least one vehicle control system of an autonomous vehicle, a plurality of recertifying computing devices, and a plurality of roadside assistance facilities computing devices, the method comprising:
receiving, from the at least one vehicle control system, incident data associated with an incident involving the autonomous vehicle;
determining a damage to the autonomous vehicle associated with the incident by analyzing the incident data;
generating, based upon the determined damage, an incident response indicating required repairs for recertifying the autonomous vehicle for operation;
identifying, based upon the incident response and a location of the autonomous vehicle, (i) a recertifying party associated with at least one of the plurality of recertifying computing devices, the recertifying party eligible to carry out the required repairs on the autonomous vehicle, and (ii) a roadside assistance facility associated with at least one of the plurality of roadside assistance facilities computing devices, the roadside assistance facility identified to transport the autonomous vehicle to the recertifying party;
receiving recertification data from the at least one recertifying computing device;
determining, based upon the recertification data, that the required repairs were performed on the autonomous vehicle; and
recertifying the autonomous vehicle for on-road operation based upon determining that the required repairs were performed on the autonomous vehicle.

9. The computer-implemented method of claim 8, wherein the incident response further indicates a list of requirements associated with the incident to be satisfied, and wherein the method further comprises satisfying the requirements by performing at least one of:
transmitting data associated with the autonomous vehicle to each party involved in the incident; or
transmitting a report to local authorities that the incident occurred.

10. The computer-implemented method of claim 8 further comprising transmitting, to the roadside assistance facility, a transport request to transport the autonomous vehicle to the recertifying party, the transport request including the location of the autonomous vehicle and a location of the recertifying party.

11. The computer-implemented method of claim 8, wherein the computer system further includes the autonomous vehicle, wherein the autonomous vehicle includes a plurality of sensors configured to collect the incident data including sub-system data of the autonomous vehicle, and wherein the vehicle control system is configured to determine that the incident has occurred.

12. The computer-implemented method of claim 8 further comprising:
receiving, from the at least one recertifying computing device, an updated blockchain including the recertification data, the recertification data including procedures performed on the autonomous vehicle; and
storing the updated blockchain associated with the autonomous vehicle in a recertification events database.

13. The computer-implemented method of claim 8 further comprising:
generating a block on a blockchain by creating a data structure including the incident data, damage data associated with the determined damage, repair data, and test data; and
storing the blockchain in a database.

14. The computer-implemented method of claim 8 further comprising storing at least one block in a node of a distributed blockchain network accessible to the at least one recertifying computing device.

15. At least one non-transitory computer-readable storage medium having computer-executable instructions embodied thereon, wherein when executed by at least one processor of a computing device in communication with at least one vehicle control system of an autonomous vehicle, a plurality of recertifying computing devices, and a plurality of roadside assistance facilities computing devices, the computer-executable instructions cause the at least one processor to:
receive, from the at least one vehicle control system, incident data associated with an incident involving the autonomous vehicle;
determine a damage to the autonomous vehicle associated with the incident by analyzing the incident data;
generate, based upon the determined damage, an incident response indicating required repairs for recertifying the autonomous vehicle for operation;
identify, based upon the incident response and a location of the autonomous vehicle, (i) a recertifying party associated with at least one of the plurality of recertifying computing devices, the recertifying party eligible to carry out the required repairs on the autonomous vehicle, and (ii) a roadside assistance facility associated with at least one of the plurality of roadside assistance facilities computing devices, the roadside assistance facility identified to transport the autonomous vehicle to the recertifying party;
receive recertification data from the at least one recertifying computing device;
determine, based upon the recertification data, that the required repairs were performed on the autonomous vehicle; and recertify the autonomous vehicle for on-road operation based upon determining that the required repairs were performed on the autonomous vehicle.

16. The at least one non-transitory computer-readable storage medium of claim 15, wherein the incident response further indicates a list of requirements associated with the incident to be satisfied, and wherein the at least one processor is further configured to satisfy the requirements by performing at least one of:

transmitting data associated with the autonomous vehicle to each party involved in the incident; or transmitting a report to local authorities that the incident occurred.

17. The at least one non-transitory computer-readable storage medium of claim 15, wherein the computer-executable instructions further cause the at least one processor to transmit, to the roadside assistance facility, a transport request to transport the autonomous vehicle to the recertifying party, the transport request including the location of the autonomous vehicle and a location of the recertifying party.

18. The at least one non-transitory computer-readable storage medium of claim 15, wherein the computer-executable instructions further cause the at least one processor to:

receive, from the at least one recertifying computing device, an updated blockchain including the recertification data, the recertification data including procedures performed on the autonomous vehicle; and store the updated blockchain associated with the autonomous vehicle in a recertification events database.

19. The at least one non-transitory computer-readable storage medium of claim 15, wherein the computer-executable instructions further cause the at least one processor to:

generate a block on a blockchain by creating a data structure including the incident data, damage data associated with the determined damage, repair data, and test data; and store the blockchain in a database.

20. The at least one non-transitory computer-readable storage medium of claim 15, wherein the computer-executable instructions further cause the at least one processor to store at least one block in a node of a distributed blockchain network accessible to the at least one recertifying computing device.

* * * * *